United States Patent
Kim et al.

(10) Patent No.: US 10,659,151 B2
(45) Date of Patent: May 19, 2020

(54) APPARATUS, SYSTEM AND METHOD FOR UTILIZING A FLEXIBLE SLOT FORMAT INDICATOR

(71) Applicant: Apple Inc., Cupertino, CA (US)

(72) Inventors: Yuchul Kim, Santa Clara, CA (US);
Wei Zeng, San Diego, CA (US);
Xiangying Yang, Cupertino, CA (US);
Dawei Zhang, Saratoga, CA (US);
Haitong Sun, Irvine, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/898,692

(22) Filed: Feb. 19, 2018

(65) Prior Publication Data
US 2018/0309513 A1    Oct. 25, 2018

Related U.S. Application Data

(60) Provisional application No. 62/488,433, filed on Apr. 21, 2017, provisional application No. 62/587,358, filed on Nov. 16, 2017.

(51) Int. Cl.
*H04B 7/26*       (2006.01)
*H04W 72/04*    (2009.01)
(Continued)

(52) U.S. Cl.
CPC .......... *H04B 7/2643* (2013.01); *H04L 5/0048* (2013.01); *H04L 5/0078* (2013.01);
(Continued)

(58) Field of Classification Search
CPC ........... H04W 72/0446; H04W 72/042; H04W 72/0406; H04W 72/0413; H04W 72/12;
(Continued)

(56) References Cited

U.S. PATENT DOCUMENTS 4,924,236 A    5/1990    Schuss
9,532,369 B2  12/2016   Susitaival
(Continued)

FOREIGN PATENT DOCUMENTS

EP    0 279 050 A1    12/1987
EP    1 248 479 A2    9/2002
(Continued)

OTHER PUBLICATIONS

International Search Report and Written Opinion, Application No. PCT/US2018/028684, dated Jul. 17, 2018, 14 pages.
(Continued)

*Primary Examiner* — Marsha D Banks Harold
*Assistant Examiner* — Elton Williams
(74) *Attorney, Agent, or Firm* — Kowert Hood Munyon Rankin and Goetzel PC; Jeffrey C. Hood

(57) ABSTRACT

Embodiments are presented herein of apparatuses, systems, and methods for utilizing a flexible slot indicator in wireless communication. A base station (BS) may establish communication with a first user equipment device (UE). The BS may determine a transmission direction for each of a plurality of symbols included in one or more slots. The BS may transmit a slot format indicator (SFI) to the UE. The SFI may indicate the transmission direction for each of the plurality of symbols included in one or more slots. The BS and the UE may perform communication during the one or more slots according to the determined transmission direction.

20 Claims, 44 Drawing Sheets

(51) Int. Cl.
*H04L 5/00* (2006.01)
*H04L 5/14* (2006.01)
*H04W 72/12* (2009.01)

(52) U.S. Cl.
CPC .......... *H04L 5/0094* (2013.01); *H04L 5/0096* (2013.01); *H04L 5/1469* (2013.01); *H04W 72/042* (2013.01); *H04W 72/0446* (2013.01); *H04W 72/1289* (2013.01); *H04L 5/0053* (2013.01)

(58) Field of Classification Search
CPC .................. H04W 72/1289; H04W 72/14; H04B 7/2656; H04B 7/2643; H04L 5/0053; H04L 5/0096; H04L 5/0078; H04L 5/003; H04L 5/0035; H04L 5/0073; H04L 5/0092; H04L 5/18; H04L 1/1861; H04L 1/1887; H04J 3/00; H04J 3/1694
See application file for complete search history.

(56) References Cited

U.S. PATENT DOCUMENTS

| | | |
|---|---|---|
| 9,723,626 B2 | 8/2017 | Golitschek Edler Von Elbwart |
| 2009/0274078 A1 | 11/2009 | Zhao et al. |
| 2013/0301490 A1* | 11/2013 | He .......................... H04W 4/90 370/280 |
| 2015/0358998 A1* | 12/2015 | Golitschek Edler Von Elbwart ................ H04W 48/16 370/280 |
| 2015/0372798 A1* | 12/2015 | Zhao ........................ H04L 5/14 370/280 |
| 2017/0332359 A1 | 11/2017 | Tsai et al. |
| 2018/0167965 A1 | 6/2018 | Wang |
| 2018/0367289 A1 | 12/2018 | Kim |

FOREIGN PATENT DOCUMENTS

| | | |
|---|---|---|
| EP | 2 955 966 A1 | 12/2015 |
| EP | 3 171 561 A1 | 5/2017 |
| EP | 3 185 361 A1 | 6/2017 |
| WO | WO 2016/003173 A1 | 1/2016 |
| WO | WO 2017/032408 A1 | 3/2017 |
| WO | WO 2017/035300 A1 | 3/2017 |
| WO | WO 2017/166195 A1 | 10/2017 |

OTHER PUBLICATIONS

Written Opinion, Application No. PCT/US2018/028684, dated Apr. 1, 2019, 11 pages.
Intel Corporarion: "Group Common PDCCH";R1-1702219; 3GPP Draft; 3rd Generation Partnership Project (3GPP), Mobile Competence Centre, 650, Route des Lucioles, F-06921, Sophia-Antipolis Cedex, France; vol. RAN WG1, no. Athens, Greece: Feb. 12, 2017; four pages.
Zhang, et al.; "TDD Single Tx Switched UL Solution"; filed Apr. 14, 2019, 61 pages.
CMCC; "Discussion on semi-static TDD configurations"; 3GPP DRAFT; RI-1703410; 3rd Generation Partnership Project (3GPP); vol. RAN WG1, no. Athens, Greece; Feb. 12, 2017; four pages.
CMCC; "Discussion on semi-static DL and UL transmission"; 3GPP DRAFT; RI-1708394; 3rd Generation Partnership Project (3GPP); vol. RAN WG1, no. Hangzhou; May 14, 2017; three pages.
International Search Report and Written Opinion, Application No. PCT/US2018/033778, dated Oct. 4, 2018, 14 pages.

* cited by examiner

LTE TDD Configurations
| TDD Conf | TTI Index | | | | | | | | | | UL:DL:S |
|---|---|---|---|---|---|---|---|---|---|---|---|
| | 0 | 1 | 2 | 3 | 4 | 5 | 6 | 7 | 8 | 9 | |
| 0 | D | S | U | U | U | D | S | U | U | U | 6:2:2 |
| 1 | D | S | U | U | D | D | S | U | U | D | 4:5:2 |
| 2 | D | S | U | D | D | D | S | U | D | D | 2:6:2 |
| 3 | D | S | U | U | U | D | D | D | D | D | 3:6:1 |
| 4 | D | S | U | U | D | D | D | D | D | D | 2:7:1 |
| 5 | D | S | U | D | D | D | D | D | D | D | 1:8:1 |
| 6 | D | S | U | U | U | D | S | U | U | D | 5:3:2 |
*Prior Art*
FIG. 5
UL Reference Configuration: 0 
DL Reference Configuration: 5 
FIG. 6        *Prior Art*
Effective eIMTA Frame Structure
Current Configurations Supported
0,1,2,3,4,5
| TTI Index | | | | | | | | | |
|---|---|---|---|---|---|---|---|---|---|
| 0 | 1 | 2 | 3 | 4 | 5 | 6 | 7 | 8 | 9 |
| D | S | U | F | F | D | S/D | F | F | F |
FIG. 7        *Prior Art*

| Format Index | Type | AL | | |
|---|---|---|---|---|
| 4 | DL(-only) | Y | | SFI indicates DL with PDCCH. |
| 5 | DL-centric | Y | | SFI indicates DL with PDCCH and short PUCCH with one OS. |
| 5a | DL-centric-a | Y | | SFI indicates DL with PDCCH and short PUCCH with two OS. |
| 6 | DL(-only) | N | | SFI indicates DL with PDCCH. |
| 7 | DL-centric | N | | SFI indicates DL with PDCCH with short PUCCH with one OS. |
| 7a | DL-centric-a | N | | SFI indicates DL without PDCCH with short PUCCH with two OS. |

FIG. 10

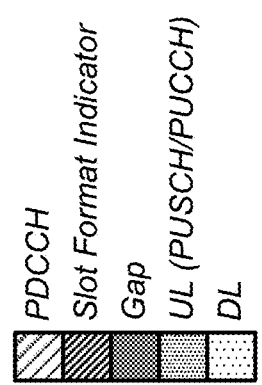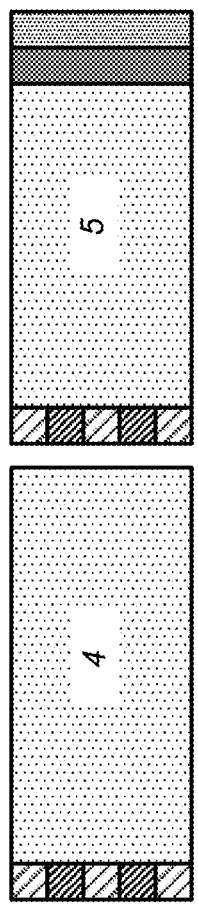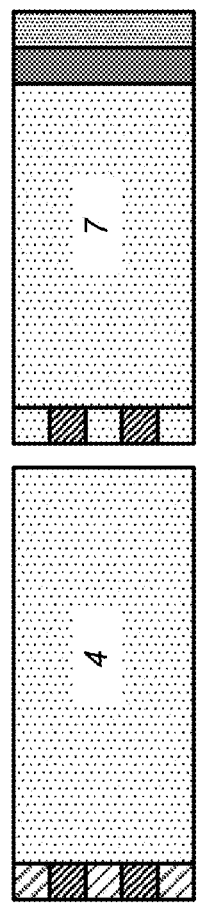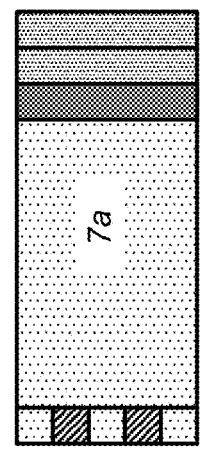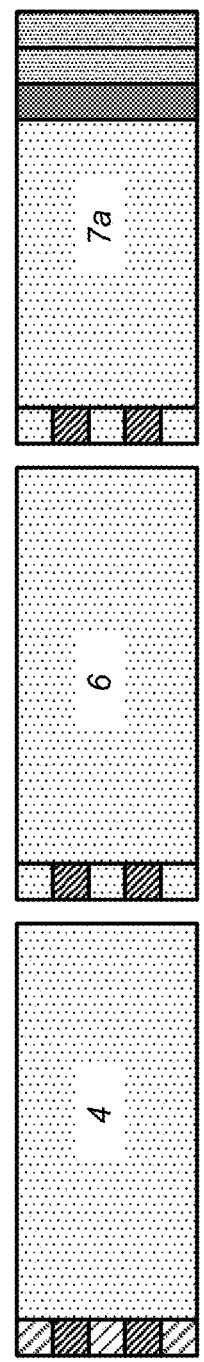
FIG. 11
FIG. 12
FIG. 13

| Format Index | Type | AL | |
|---|---|---|---|
| 5 | DL-centric-1 | 1 | |
| 5a | DL-centric-2 | 1 | |
| 6 | DL-centric-1 | 2 | |
| 6a | DL-centric-2 | 2 | |

*FIG. 14A*

| Format Index | Type | AL | | | | |
|---|---|---|---|---|---|---|
| 7 | DL-centric-1 | 3 | | | | |
| 7a | DL-centric-2 | 3 | | | | |
| 8 | DL-centric-1 | 4 | | | | |
| 8a | DL-centric-2 | 4 | | | | |

FIG. 14B

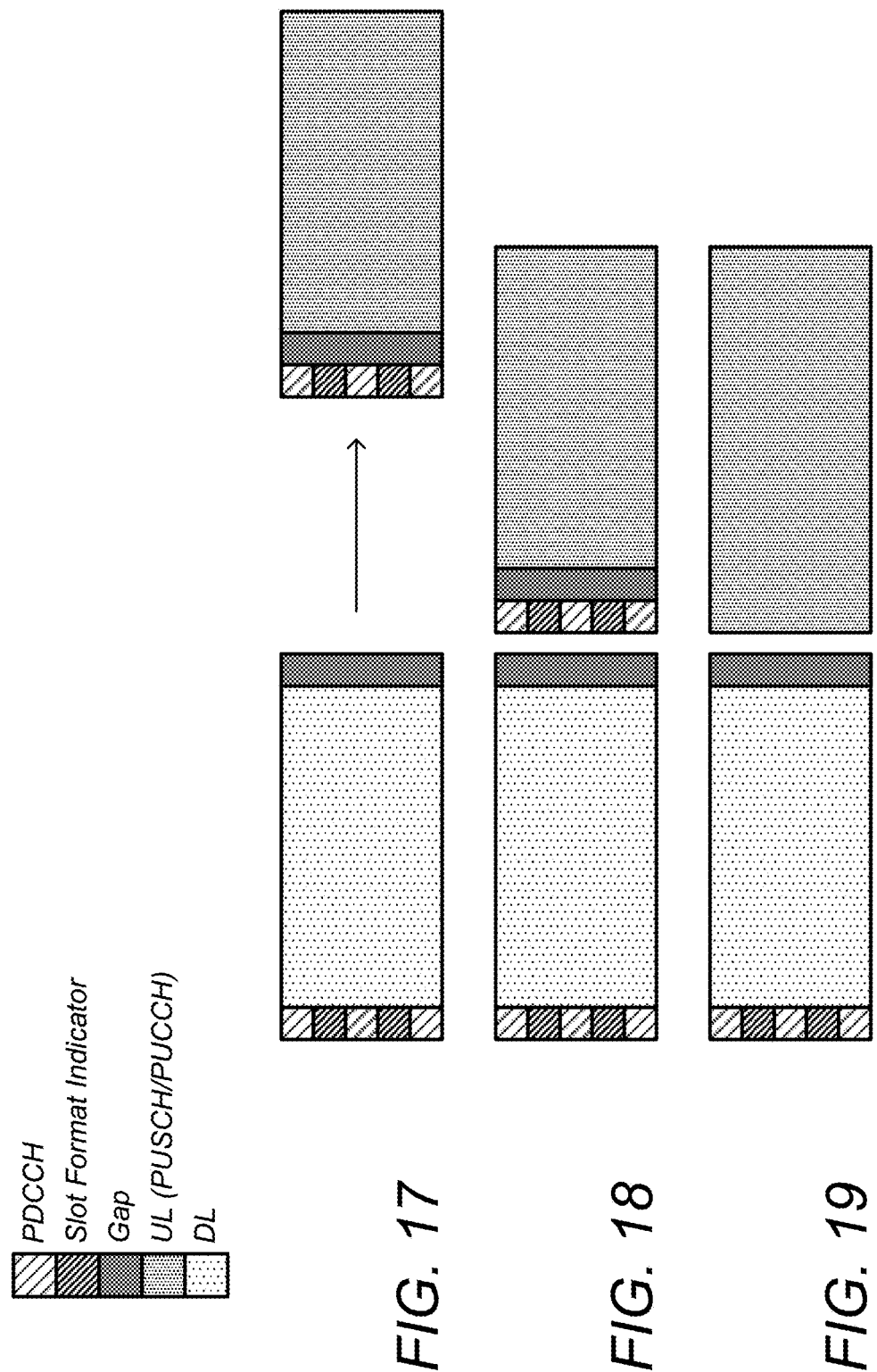

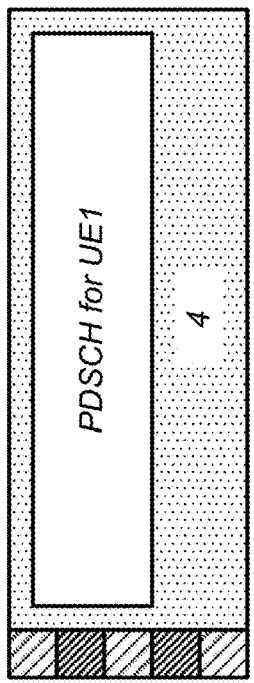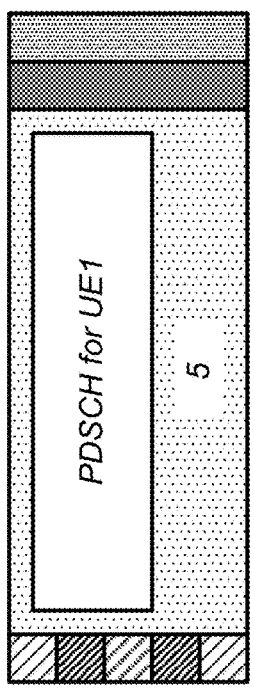
FIG. 23
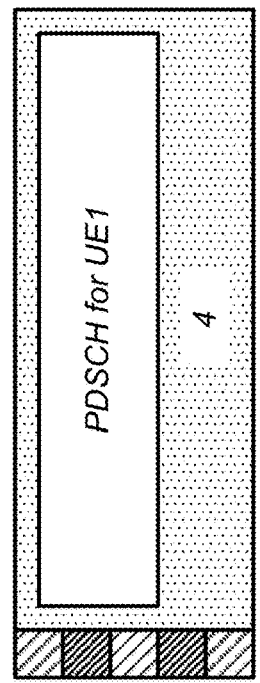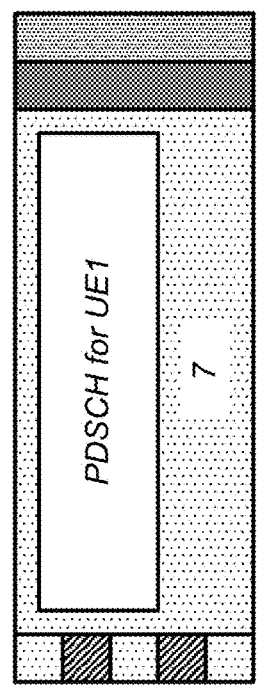
FIG. 24

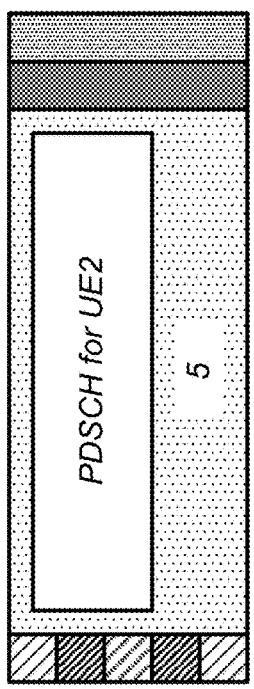
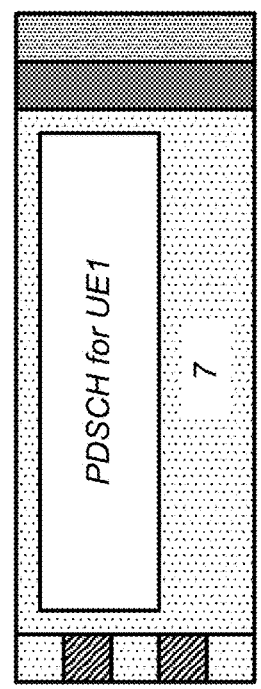
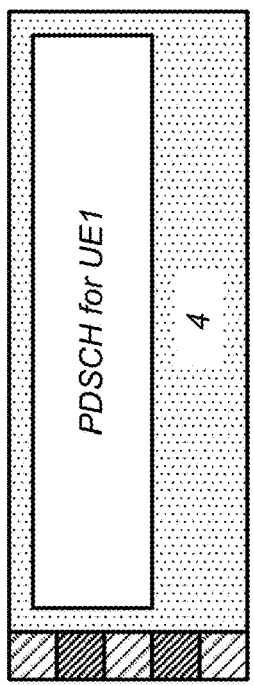
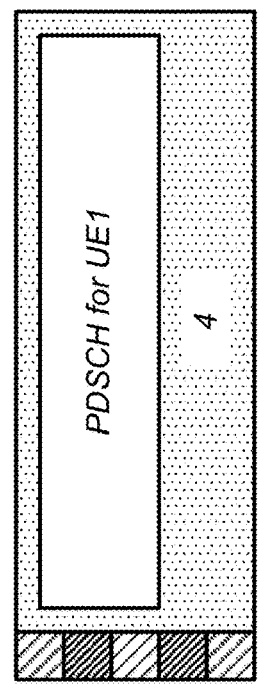
FIG. 25
FIG. 26

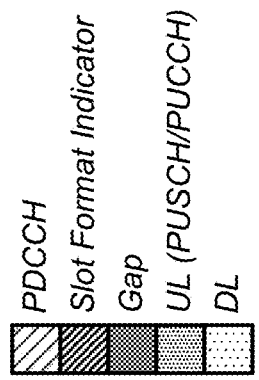
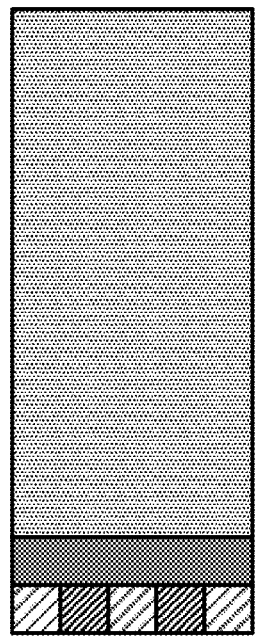
FIG. 27
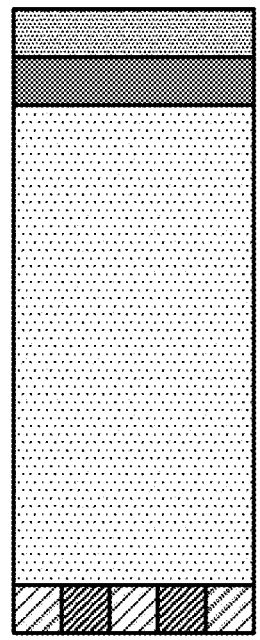
FIG. 28

2900

Transmit a first slot format indicator (SFI) within a first slot of a radio frame, wherein the first SFI indicates a first transmission direction for at least a first portion of the first slot, wherein the first transmit direction is either uplink transmission or downlink transmission
2910

Receive a first slot format indicator (SFI) from a first slot of a radio frame, wherein the first SFI indicates a first transmission direction for at least a first portion of the first slot, wherein the first transmit direction is either uplink transmission or downlink transmission, wherein the SFI is included in a group common PDCCH of a PDCCH region of the first slot, wherein the PDCCH region spans the first N symbol durations of the first slot, wherein N is greater than or equal to one.
3010

| Format Index | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| C39 | DL | DL | DL | DL | DL | UL | DL | DL | DL | DL | UL | UL | UL | UL |
| C40 | DL | DL | DL | DL | UL | UL | DL | DL | DL | DL | UL | UL | UL | UL |
| C41 | DL | DL | DL | DL | UL | UL | DL | DL | DL | DL | DL | UL | UL | UL |
| C42 | DL | DL | DL | DL | UL | UL | DL | DL | DL | DL | DL | DL | UL | UL |

*FIG. 34J*

| 1 | 2 | 3 | 4 | 5 | 6 | 7 | 8 | 9 | 10 | 11 | 12 | 13 | 14 |
|---|---|---|---|---|---|---|---|---|---|---|---|---|---|
| DL | DL | DL | UL | UL | UL | DL | DL | DL | DL | UL | UL | UL | UL |
| DL | DL | DL | DL | UL | UL | DL | DL | DL | DL | UL | UL | UL | UL |
| DL | DL | DL | DL | UL | UL | DL | DL | DL | DL | DL | UL | UL | UL |
| DL | DL | DL | DL | UL | UL | DL | DL | DL | DL | DL | DL | UL | UL |

| 1 | 2 | 3 | 4 | 5 | 6 | 7 | 8 | 9 | 10 | 11 | 12 | 13 | 14 |
|---|---|---|---|---|---|---|---|---|---|---|---|---|---|
| DL | DL | DL | UL | UL | UL | DL | DL | DL | DL | UL | UL | UL | UL |
| DL | DL | DL | DL | UL | UL | DL | DL | DL | DL | UL | UL | UL | UL |
| DL | DL | DL | DL | UL | UL | DL | DL | DL | DL | DL | UL | UL | UL |
| DL | DL | DL | DL | UL | UL | DL | DL | DL | DL | DL | DL | UL | UL |

| Format Index | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CS1 | DL | D | D | D | U | U | DL | DL | DL | DL | D | D | D | UL |
| CS2 | DL | D | D | D | U | U | DL | DL | DL | DL | D | D | D | UL |
| CS3 | DL | D | D | D | U | U | DL | DL | DL | DL | D | D | D | UL |

FIG. 34M

| Format Index | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CS4 | DL | D | D | U | U | UL | DL | DL | DL | DL | D | D | D | UL |
| CS5 | DL | D | D | U | U | UL | DL | DL | DL | DL | D | D | D | UL |
| CS6 | DL | D | D | U | U | UL | DL | DL | DL | DL | D | D | D | UL |

FIG. 34N

| Format Index | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CS7 | DL | DL | D | U | U | UL | DL | DL | DL | DL | U | U | UL | UL |
| CS8 | DL | DL | D | U | U | UL | DL | DL | DL | DL | U | U | UL | UL |
| CS9 | DL | DL | D | U | U | UL | DL | DL | DL | DL | U | U | UL | UL |

FIG. 34O

| Format Index | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| C60 | D | D | D | D | UL | UL | DL | D | D | D | D | D | UL | UL |
| C61 | D | D | D | D | UL | UL | DL | DL | D | D | D | D | UL | UL |
| C62 | D | D | D | D | UL | UL | DL | DL | DL | D | D | D | UL | UL |

*FIG. 34P*

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| C63 | DL | D | D | D | UL | UL | DL | DL | D | D | D | D | UL | UL |
| C64 | DL | D | D | D | UL | UL | DL | DL | DL | D | D | D | UL | UL |

*FIG. 34Q*

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| C65 | DL | D | D | D | UL | UL | DL | DL | DL | D | D | D | UL | UL |
| C66 | DL | DL | D | D | UL | UL | DL | DL | DL | D | D | D | UL | UL |

*FIG. 34R*

*Format Index*

| Format Index | 1 | 2 | 3 | 4 | 5 | 6 | 7 |
|---|---|---|---|---|---|---|---|
| D1 | DL | DL | DL | DL | DL | DL | DL |
| D2 | UL | UL | UL | UL | UL | UL | UL |
| D3 | UL | UL | UL | UL | UL | UL | UL |

FIG. 35A

| Format Index | 1 | 2 | 3 | 4 | 5 | 6 | 7 |
|---|---|---|---|---|---|---|---|
| D4 | UL | UL | UL | UL | UL | UL | UL |
| D5 | DL | DL | UL | UL | UL | UL | UL |
| D6 | DL | DL | DL | UL | UL | UL | UL |
| D7 | DL | DL | DL | DL | UL | UL | UL |
| D8 | DL | DL | DL | DL | DL | UL | UL |
| D9 | DL | DL | DL | DL | DL | DL | UL |
| D10 | DL | DL | DL | DL | DL | DL | DL |

| Format Index | 1 | 2 | 3 | 4 | 5 | 6 | 7 |
|---|---|---|---|---|---|---|---|
| D22 | U | U | U | U | U | UL | UL |
| D23 | DL | U | U | U | U | UL | UL |
| D24 | DL | DL | U | U | U | UL | UL |
| D25 | DL | DL | DL | U | U | UL | UL |

FIG. 35E

| Format Index | 1 | 2 | 3 | 4 | 5 | 6 | 7 |
|---|---|---|---|---|---|---|---|
| D26 | U | U | U | U | U | UL | UL |
| D27 | DL | U | U | U | U | UL | UL |
| D28 | DL | DL | U | U | U | UL | UL |

FIG. 35F

| Format Index | 1 | 2 | 3 | 4 | 5 | 6 | 7 |
|---|---|---|---|---|---|---|---|
| D29 | U | U | U | U | U | UL | UL |
| D30 | DL | U | U | U | U | UL | UL |

FIG. 35G

| Single Slot Format Index | Format |
|---|---|
| 0 | A1 |
| 1 | A2 |
| 2 | A3 |
| ... | ... |
| 106 | A107 |
| 107 | B1 |
| 108 | B2 |
| 109 | B3 |
| 110 | B4 |
| 111 | B5 |
| 112 | B6 |
| ... | ... |
| 121 | B15 |
| 122 | C1 |
| ... | ... |
| 191 | C70 |

*FIG. 36*

| Single Slot Format Index | Format |
|---|---|
| 0 | A1 |
| 1 | A2 |
| ... | ... |
| 106 | A107 |
| 107 | (D5, D5) |
| 108 | (D6, D6) |
| | ... |
| | ... |
| | |
| 191 | (D29, D30) |

FIG. 37

| SFI in GC-PDCCH | Format |
|---|---|
| 0 | (D1, D1) |
| 1 | (D2, D2) |
| ... | ... |
| 106 | ... |
| 107 | (D5, D5) |
| 108 | (D6, D6) |
| | ... |
| | ... |
| | |
| 191 | (D29, D30) |

FIG. 38

| SFI in GC-PDCCH | Single Slot Format Indices |
|---|---|
| 0 | 0 |
| 1 | 5, 5 |
| 2 | 5, 6 |
| 3 | 14, 1, 0 |
| 4 | 15, 1, 0 |
| 5 | 14, 2, 0 |
| 6 | 15, 2, 0 |
| 7 | 14, 2, 2, 0 |

FIG. 39

| SFI in GC-PDCCH | Single Slot Format Indices |
|---|---|
| 0 | 0, 5 |
| 1 | 4, 4 |
| 2 | 5, 5 |
| 3 | 5, 2, 5, 5 |
| 4 | 5, 1, 5, 4 |
| 5 | 110, 110, 110, 110 |
| 6 | 108, 108, 112, 112 |
| 7 | NA |

FIG. 40

| SFI in GC-PDCCH | Single Slot Format Indices |
|---|---|
| 0 | 14, 14, 14, 14, 14 |
| 1 | 14, 14, 14, 14, 4 |
| 2 | 14, 14, 14, 4, 4 |
| 3 | 14, 14, 4, 4, 4 |
| 4 | 14, 4, 4, 4, 4 |
| 5 | 4, 4, 4, 4, 4 |
| 6 | 5, 15, 15, 1, 1, 1, 1, 1, 15, 15 |
| 7 | 5, 15, 15, 1, 1, 5, 5, 5, 15, 15 |

FIG. 41

APPARATUS, SYSTEM AND METHOD FOR UTILIZING A FLEXIBLE SLOT FORMAT INDICATOR

PRIORITY CLAIM

This application claims benefit of priority of:
U.S. provisional application Ser. No. 62/488,433 titled "Flexible Slot Format Indicator" filed Apr. 21, 2017; and
U.S. provisional application Ser. No. 62/587,358 titled "Flexible Slot Format Indicator" filed Nov. 16, 2017;
both of which are hereby incorporated by reference in their entirety as though fully and completely set forth herein.

TECHNICAL FIELD

The present application relates to wireless communication, and more particularly, to mechanisms for flexibly signaling the transmission format of slots in a radio frame.

DESCRIPTION OF THE RELATED ART

There exists a need for mechanisms of signaling (especially, flexibly and dynamically signaling) to UEs the time division duplex (TDD) structure of slots or groups of slots in a radio frame.

SUMMARY

Embodiments are presented herein of apparatuses, systems, and methods for utilizing a flexible slot indicator in wireless communication.

A base station (BS) may establish communication with a first user equipment device (UE). The BS and the UE may each include wireless communication circuitry for performing wireless communication with each other and/or other devices. Additionally, the BS and the UE may each include one or more processing elements, e.g., that may execute program instructions to operate the respective device.

In some embodiments, the BS may determine a transmission direction for each of a plurality of symbols included in one or more slots. The BS may determine this transmission direction for the plurality of symbols in a dynamic fashion or a semistatic fashion, as desired. Additionally, the determination may be performed for a single UE, for a plurality of UEs, and/or all UEs in communication with the BS.

Based on the determination, the BS may transmit a slot format indicator (SFI) to the UE. The SFI may indicate the transmission direction for each of the plurality of symbols included in one or more slots. The SFI may specify the transmission direction for 14 symbols of a first slot, e.g., as "uplink", "downlink", and/or "unknown". In some embodiments, the BS may transmit a table to the UE specifying a plurality of sets of transmission directions, where each set of transmission directions specifies the transmission direction of at least one slot. Accordingly, the SFI may refer to a table entry of the table that specifies or otherwise indicates one of the sets of transmission directions. Note that the table may have been previously transmitted by the BS (e.g., prior to transmitting the SFI), by a different BS or other entity of the wireless network, and/or may have simply been stored by the UE at a different time.

In some embodiments, the BS may be configured to determine the transmission direction for symbols of a plurality of slots and the SFI may indicate the transmission direction for the symbols for more than one slot at a time. For example, the SFI may indicate the transmission directions for a first slot, a second slot, or n slots. These transmission directions may be the same or different for each of the slots. For example, the transmission directions may be the same for the first slot and the second slot indicated by a single SFI. Alternatively, the transmission directions may be different between the first slot and the second slot, even though both are indicated by the single SFI. In some embodiments, the single SFI may refer to an entry of the table discussed above, and the table entry may indicate a plurality of single slot formats (e.g., corresponding to each respective slot specified by the table entry) for the plurality of slots.

The BS and the UE may perform communication during the one or more slots according to the determined transmission direction.

Note that the determination and/or transmission of the SFI may be performed in a periodic manner. For example, the SFI may be transmitted periodically every n slots, where n could be any desired value (e.g., 1, 2, 3, 5, 10, etc.). Additionally, or alternatively, the SFI may be determined or updated in a dynamic fashion, based on different events or situations. For example, the SFI may be in effect until it is updated by a new SFI, e.g., transmitted by the BS. In some embodiments, the SFI may be transmitted one or more symbols (e.g., a plurality of symbols) before the one or more slots indicated by the SFI. For example, the SFI may be transmitted for a future slot in order to ensure the UE can be prepared for the transmission directions indicated by the SFI for the slot(s) indicated by the SFI.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present embodiments can be obtained when the following detailed description of the preferred embodiment is considered in conjunction with the following drawings.

FIG. 5 illustrates exemplary TDD configurations, according to some embodiments;

FIG. 6 illustrates exemplary UL and DL reference configurations, according to some embodiments;

FIG. 7 illustrates an exemplary corresponding frame structure from FIG. 6, according to some embodiments;

FIG. 10 illustrates various exemplary downlink-centric slot formats, according to some embodiments;

FIG. 11 illustrates exemplary slot aggregation, according to some embodiments;

FIGS. 12 and 13 illustrate examples of slot aggregation, according to some embodiments;

FIGS. 14A and 14B correspond to SFI for downlink, according to some embodiments;

FIGS. 17-19 illustrate dynamic configuration of slots, according to some embodiments;

FIGS. 23-28 illustrate exemplary implementations for PDSCH, according to some embodiments;

FIGS. 29 and 30 are exemplary methods for operating a base station and a UE, according to some embodiments;

FIGS. 33A-33E illustrate 7 symbol, repeating combination possibilities for slots, according to some embodiments;

FIGS. 34A-34U illustrate 7 symbol, non-repeating combination possibilities for slots, according to some embodiments;

FIGS. 35A-35G illustrate 7 symbol possibilities, according to some embodiments;

FIGS. 36-38 illustrate exemplary SFI index and formats corresponding to FIGS. 32A-35G, according to some embodiments;

FIGS. 39-41 illustrate exemplary UE SFI index tables, according to some embodiments;

Figure 1:
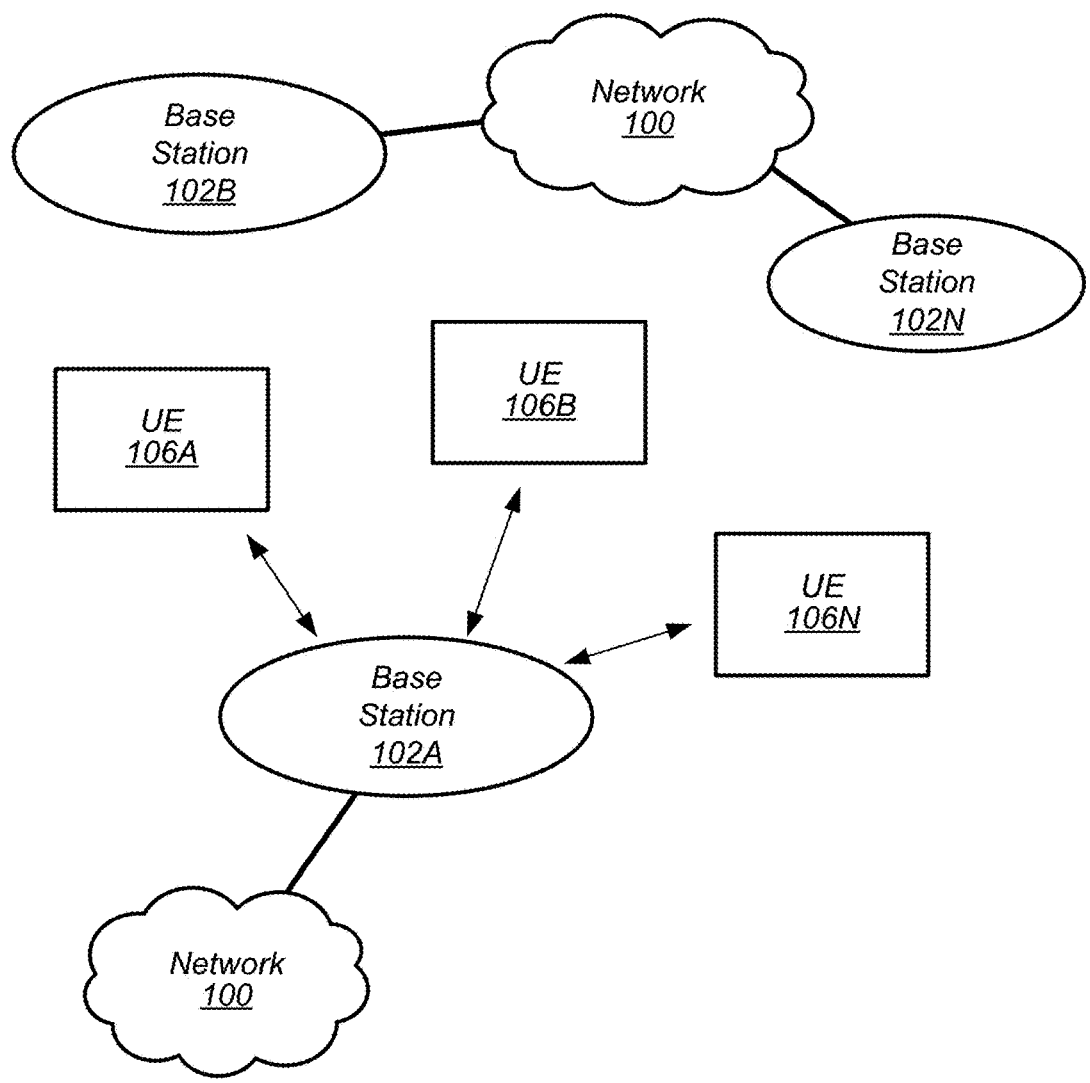
FIG. 1 illustrates an exemplary (and simplified) wireless communication system, according to some embodiments.

While embodiments described herein susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the present embodiments as defined by the appended claims.

DETAILED DESCRIPTION

Acronyms
ARQ: Automatic Repeat Request
DCI: Downlink Control Information
DL: Downlink
gNB: gNodeB
LTE: Long Term Evolution
NW: Network
NR: New Radio
PCFICH: Physical Control Format Indicator Channel
PDCCH: Physical Downlink Control Channel
PDSCH: Physical Downlink Shared Channel
PHICH: Physical Hybrid-ARQ Indicator Channel
PUCCH: Physical Uplink Control Channel
PUSCH: Physical Uplink Shared Channel
RNTI: Radio Network Temporary Identifier
RRC: Radio Resource Control
SIB: System Information Block.
SIBn: System Information Block Type n
SL: Side Link
TDD: Time Division Duplex.
TTI: Transmit Time Interval
UE: User Equipment
UL: Uplink Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
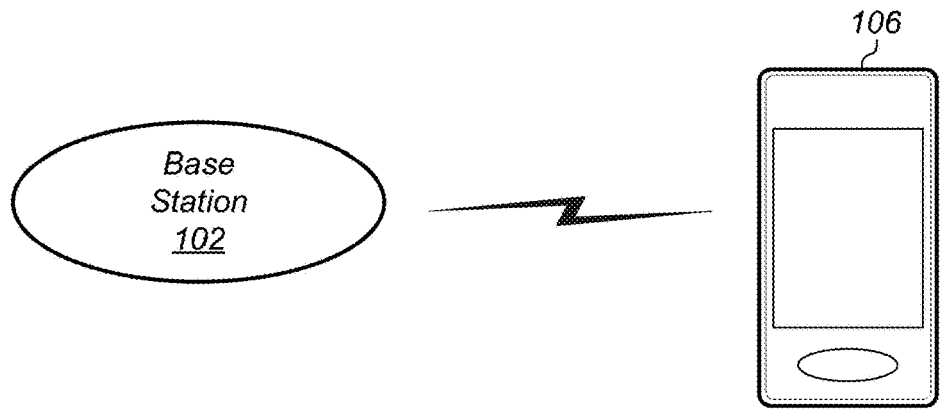
FIG. 2 illustrates an exemplary base station in communication with an exemplary wireless user equipment (UE) device, according to some embodiments.

FIGS. 1 and 2—Communication System

FIG. 1 illustrates an exemplary (and simplified) wireless communication system, according to one embodiment. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX, New Radio (NR), etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may provide a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.), NR. The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to one embodiment. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE, 1×RTT, and NR (or LTE or GSM), and separate radios for communicating using each of Wi-Fi and Bluetooth. Other configurations are also possible.

Figure 3:
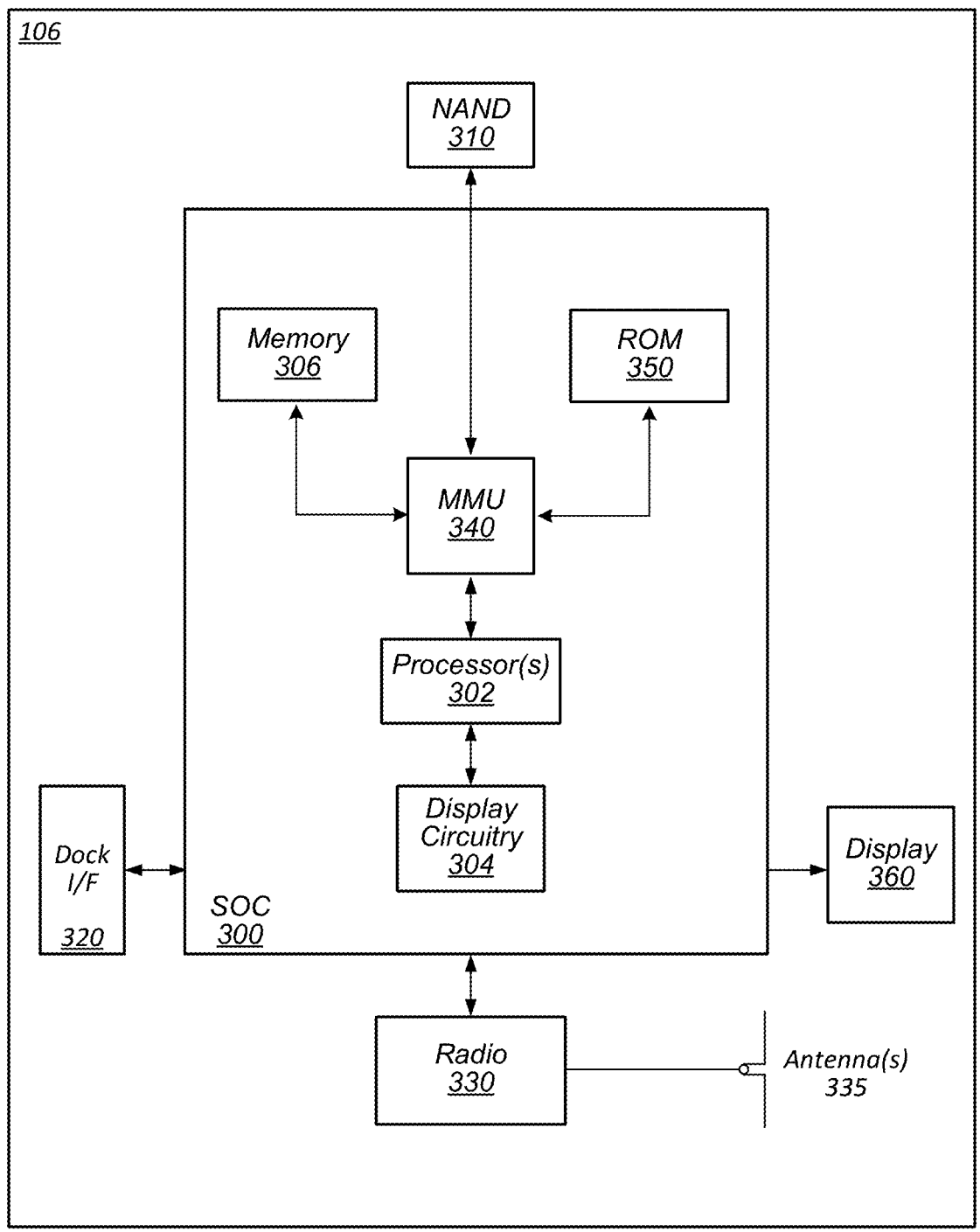
FIG. 3 illustrates an exemplary block diagram of a UE, according to some embodiments.

FIG. 3—Exemplary Block Diagram of a UE

FIG. 3 illustrates an exemplary block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication standards in some embodiments.

As described further subsequently herein, the UE 106 may include hardware and software components for implementing features relating to the use of the slot format indicator as variously described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
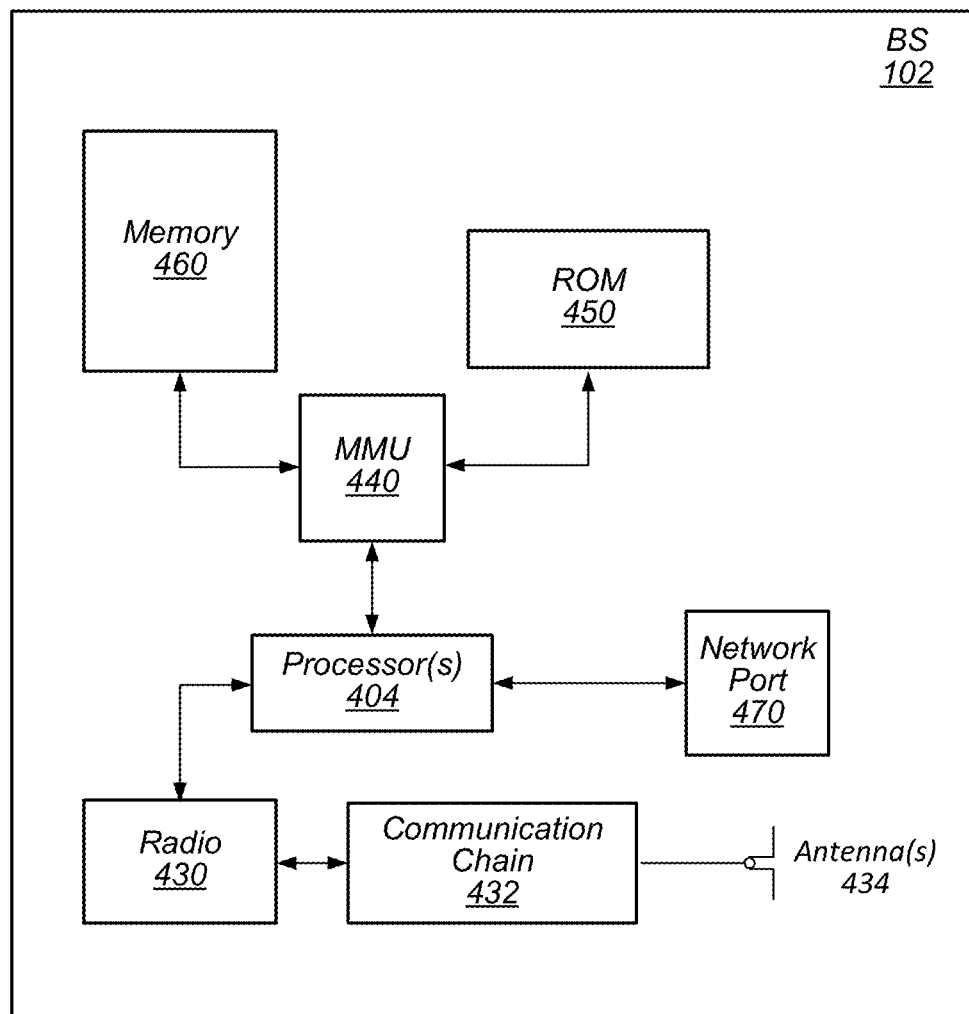
FIG. 4 illustrates an exemplary block diagram of a base station, according to some embodiments.

FIG. 4—Exemplary Block Diagram of a Base Station

FIG. 4 illustrates an exemplary block diagram of a base station 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, NR, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include a NR radio for performing communication according to NR as well as a Wi-Fi radio for performing communication according to Wi-Fi. In such a case, the base station 102 may be capable of operating as both a NR base station and a Wi-Fi access point. As another possibility, the base station 102 may include a multi-mode radio, which is capable of performing communications according to any of multiple wireless communication technologies (e.g., NR and Wi-Fi; NR and LTE; LTE and CDMA2000; UMTS and GSM; etc.).

As described further subsequently herein, the BS 102 may include hardware and software components for implementing features relating to the use of the slot format indicator as variously described herein.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein.

Group Common PDCCH

Group common PDCCH is a channel carrying information intended for a group of user equipments (UEs). The qualifier "common" does not necessarily imply common per cell.

Potential use cases for the group common PDCCH include:

(1) indicating slot format in dynamic TDD (UL, DL, SL, blank, etc.);

(2) indicating control resource set duration, in which case the UE can determine whether some blind decodings can be skipped;

(3) indicating starting position of downlink data.

The physical channel structure of the group common PDCCH may be realized using a PCFICH like approach. Alternatively, the PDCCH design may be reused.

The network (NW) may configure a UE to monitor the group common PDCCH using RRC signaling. In other words, the network may send RRC signal(s) to a UE to indicate whether the UE is to decode the group common PDCCH or not.

TDD Configuration in LTE

In LTE Release 8, the TDD configuration is defined to indicate the direction of transmissions in each slot of a radio frame. (A radio frame may be 10 ms in duration.) Seven different TDD configurations were defined, as shown in FIG. 5. (The symbol D denotes downlink; S denotes special subframe for switching; U denotes uplink.)

eIMTA in LTE Release 12 eIMTA is an acronym for "enhanced Interference Mitigation and Traffic Adaptation". In eIMTA, configuration could be changed dynamically through the downlink control information (DCI).

In eIMTA, the TDD configuration in determined as follows. The TDD Frame structure is generated from combining an UL reference configuration and a DL reference configuration. An example of an UL reference configuration and a DL reference configuration are shown in FIG. 6. FIG. 7 shows the effective TDD frame structure resulting from the example of FIG. 6. F denotes a TTI that is either downlink (D) or uplink (U). In eIMTA, only a slot designated with F could be dynamically changed. The current configurations supported with the frame structure of FIG. 7 are 0, 1, 2, 3, 4, 5.

The uplink reference configuration is semi-statically configured, obtained by the UE from SIB1. The uplink reference configuration is used by non-eIMTA-capable devices, and is known as the "uplink-downlink configuration" in an earlier release (~R11). The uplink reference configuration is an uplink heavy configuration. DL subframes in the uplink reference configuration are guaranteed to be DL: e.g., for transmission of PHICH.

The downlink reference configuration is semi-statically configured, obtained by the UE from dedicated RRC signaling, specific to eIMTA-capable devices. UL subframes in this configuration is guaranteed to be UL: e.g., for HARQ feedback.

The current uplink-downlink configuration determines which subframes of the current frame are uplink and which are downlink. The current uplink-downlink configuration is chosen from among 7 possible configurations and within the limits set by flexible subframes obtained from reference configurations. The current uplink-downlink configuration is broadcasted regularly to follow traffic variation. The current uplink-downlink configuration is broadcasted using DCI format 1C on PDCCH to all eIMTA devices (using eIMTA-RNTI).

Flexible Slot Format Indicator in Dynamic TDD

Figure 8:
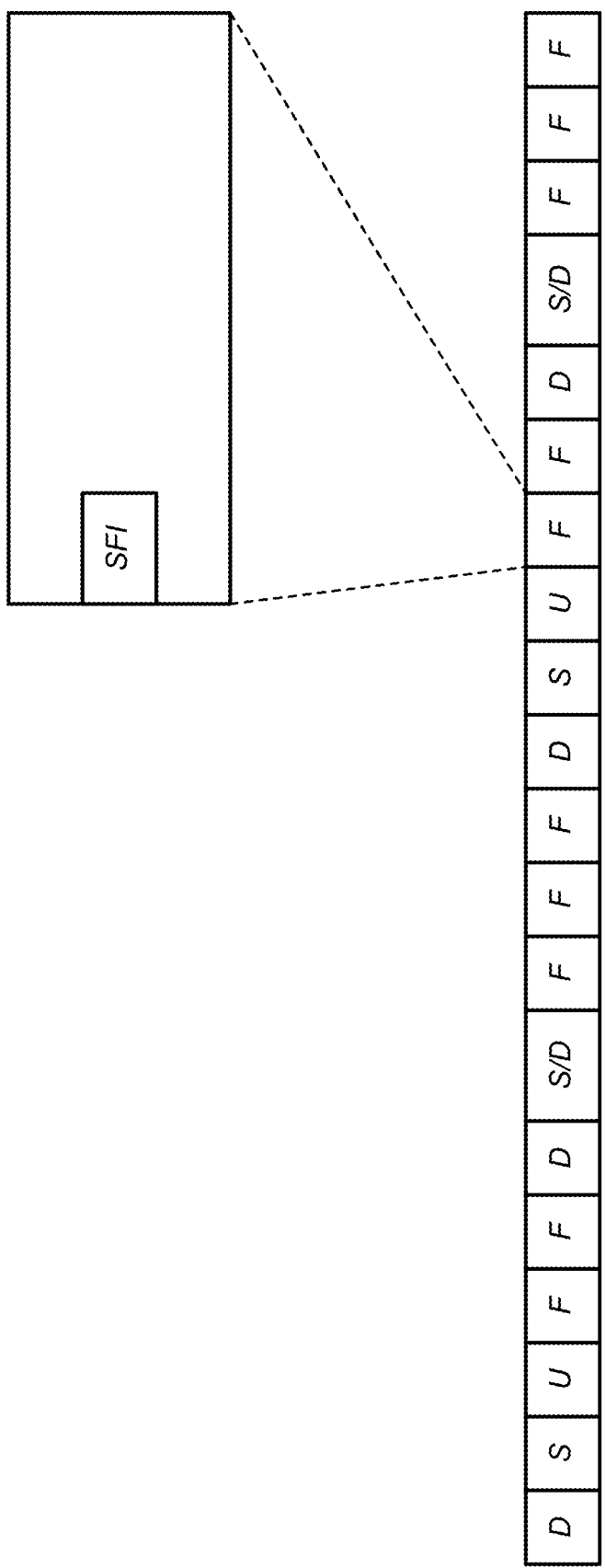
FIG. 8 illustrates an exemplary TDD frame structure, according to some embodiments.

In LTE, a slot may be a downlink slot (D), an uplink slot (U), a special frame slot (S) or a flexible slot (F). FIG. 8 shows an example of a TDD frame structure including slots of each kind. The notation "S/D" indicates that the corresponding slot could be either S or D.

In NR, the slot format indicator (SFI) indicates whether a slot is downlink (DL), uplink (UL), sidelink (SL), blank (reserved), etc. FIG. 8 shows a slot format indicator (SFI) in an initial portion of an F slot. The SFI may override the transmission direction indicated by a current TDD configuration of the frame. For example, if the current TDD configuration indicates that the F slot should be uplink, the SFI may override the transmission direction to downlink. Thus, the SFI provides a dynamic override capability at the granularity of a slot.

In some embodiments, the SFI may be included only in F slots. In other embodiments, an SFI may be included in any of the slots of the frame.

The slot format indicator (SFI) may be included in group common PDCCH. The SFI may signal the slot format at least for the current slot in a dynamic TDD system. In some embodiments, the SFI may signal the slot format for one or more consecutive slots including the current slot.

The SFI is common information delivered to a group of UEs. The SFI may indicate whether the slot is UL, DL, SL, blank (reserved), etc.

The SFI is decodable by group of UEs, e.g., a group of UEs designated by RRC signaling.

In some embodiments, non-served UEs can use the received SFI to avoid unnecessary blind decodings, for power saving.

SFI Encoding Based on Table—SFI for UL

Figure 9:
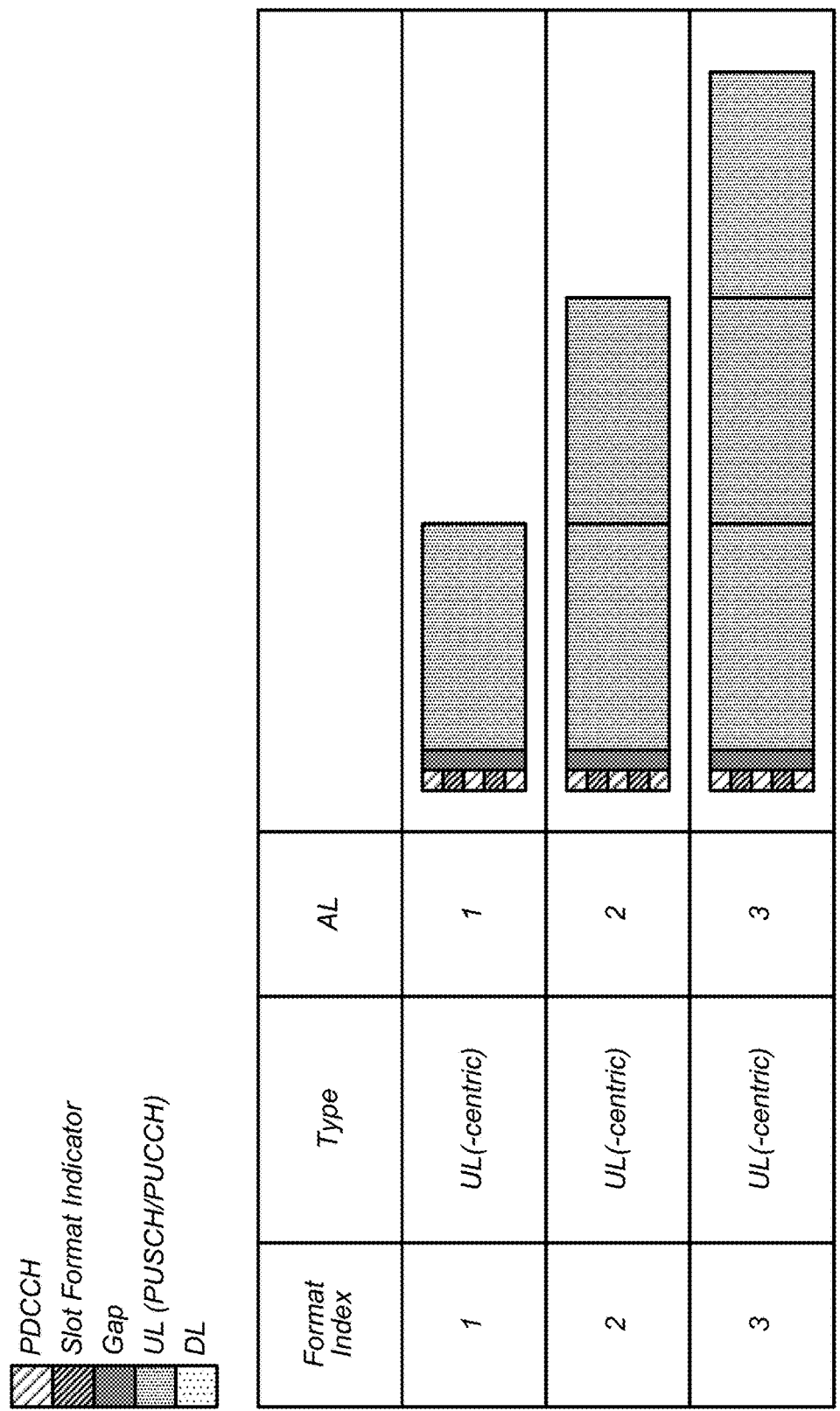
FIG. 9 illustrates various exemplary uplink-centric slot formats, according to some embodiments.

In some embodiments, the SFI may indicate any of the uplink-centric slot formats shown in FIG. 9. These slot formats vary in aggregation level, i.e., the number of slots that are combined together to form a continuous uplink region. The main use cases for these uplink-centric slot formats are PUSCH and/or PUCCH transmission.

UL-centric slots may include PDCCH for transmitting UL grants to UE.

UL aggregation level (AL), e.g., 1, 2, 3, . . . , may be encoded in SFI.

The SFI may signal UL slot aggregation, and accordingly, no PDCCH is included in any of the following slots.

When UL slot aggregation is indicated, non-served UEs can sleep through the uplink portion of the first slot and through all of the following slot(s). (A UE will determine from the PDCCH of the first slot whether or not it is scheduled in the aggregated set of slots.) For example, when AL=3, the UE can sleep through the uplink portion of the first slot and through all of the second and third slots.

SFI Encoding Based on Table—SFI for DL

In some embodiments, the SFI may indicate any of the downlink-centric formats shown in FIG. 10. These downlink-centric formats are for the current slot, i.e., the slot which contains the SFI. The SFI may be transmitted in every downlink slot. The main use cases for these downlink-centric formats are PDSCH transmission, with and without slot aggregation.

The SFI for DL may not encode aggregation level (AL) since the SFI may be sent in every DL slot, and DL aggregation is signaled UE-specifically in the downlink control information (DCI).

Some of the states of the SFI for DL may indicate the presence of PDCCH in the PDCCH region. Other states indicate that PDCCH is not present.

Examples of SFI and DL Slot Aggregation

FIG. 11 shows an example of slot aggregation, where additional scheduling in the middle of the aggregation is allowed, by virtue of the PDCCH that is included in the PDCCH region of the second slot. (In some embodiments, the PDCCH region of each slot may span the first OFDM symbol of the slot.) Two slots are aggregated. Some UEs are scheduled with Aggregation Level equal to 2. Furthermore, some UEs can be scheduled in the second slot, by virtue of the PDCCH in the second slot. Acknowledgements for DL data transmissions may be sent at the end of second slot.

FIGS. 12 and 13 show examples of slot aggregation with no additional scheduling in the middle of the aggregation. FIG. 12 shows an example where two slots are aggregated; FIG. 13 shows an example where three slots are aggregated. All the scheduled UEs may be scheduled from the first slot via the PDCCH of the first slot. In the provided example, no UE is scheduled from the second slot (or from any non-initial slot), so there is no PDCCH in the second slot. Accordingly, a non-scheduled UE can avoid making blind decoding attempts in search of PDCCH in the second slot (or in non-initial slots).

SFI for DL (Alternative Approach)

Alternatively, the SFI for DL could be defined on the assumption that no PDCCH region is allowed in non-initial slots of an aggregation. As shown in FIGS. 14A and 14B, only the initial slot includes a PDCCH region. (In some embodiments, the PDCCH region may span the first OFDM symbol of the slot, and includes a group common PDCCH and a set of one or more PDCCHs.)

The SFI for DL, which may occur in the group common PDCCH of the PDCCH region of the initial slot, may indicate the DL(-centric) slot format for all the aggregated slots (where AL>=1). The main use cases are PDSCH transmission with and without slot aggregation. The SFI for DL does indicate Aggregation Level (AL) since SFI could be sent only in the initial DL slot.

SFI for Blank(Reserved)/Side Link (SL)

Figure 15:
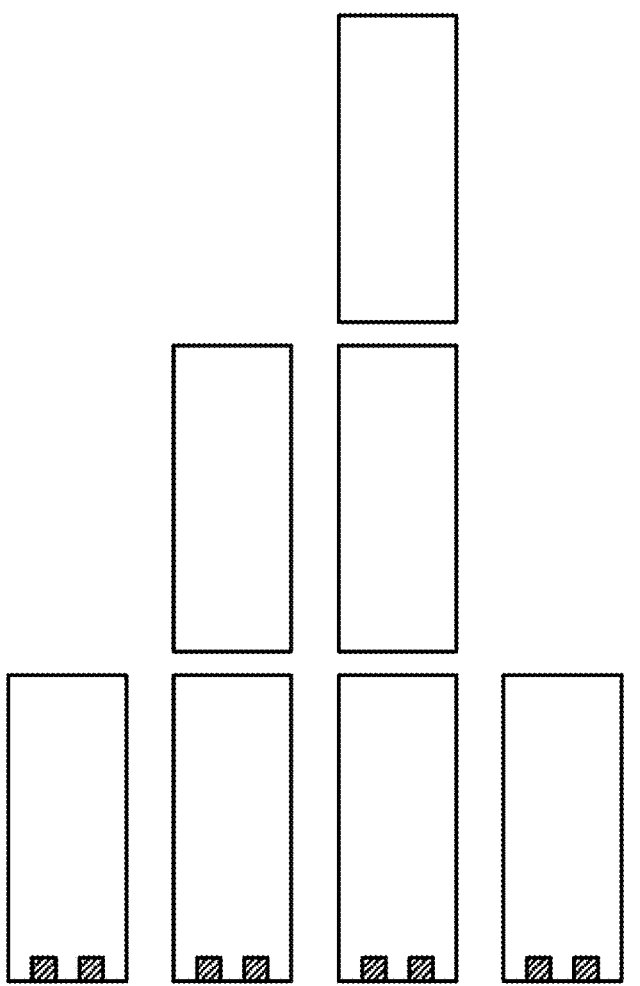
FIG. 15 illustrates SFI for blank slots, according to some embodiments.

In some embodiments, some of the states of the SFI may be used for indicating a blank slot that is used for forward compatibility, as shown in FIG. 15. A base station may not transmit or receive signal which legacy UE understands during a blank region of the slot, e.g., during the set complement of resource elements containing the SFI (or containing the group common PDCCH). Similarly, a legacy UE device may power down its transmitter and receiver during a blank region of the slot. Base stations and UEs operating according to future standards (or future versions of a current standard) might transmit during this slot, e.g., NR phase II systems. AL is encoded in the SFI. Thus, a plurality of slots may be aggregated to form a blank region that continuously covers more than one slot.

In some embodiments, one or more of the states of the SFI may be used to indicate that side link (SL) transmission is enabled, e.g., as illustrated in FIG. 15 with format index 13. A side link transmission is a device-to-device transmission (e.g., UE to UE, or vehicle to vehicle, etc.).

DL and UL Combination

Figure 16:
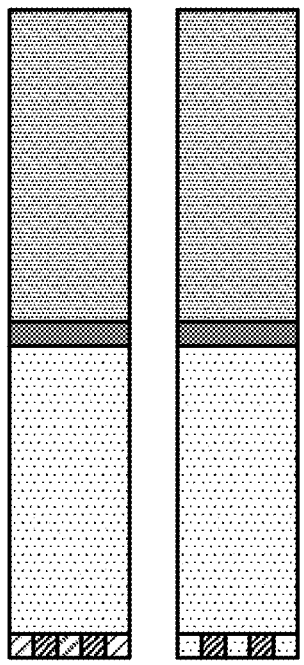
FIG. 16 illustrates two exemplary states of SFI, according to some embodiments.

In some embodiments, some of the states of the SFI may be used to indicate a combination of downlink and uplink transmission covering two or more consecutive slots. For example, FIG. 16 illustrates two states of the SFI, each indicating a two slot combination of downlink and uplink, with the ratio of DL to UL being 1. The format index 14 may indicate that PDCCH is included in the PDCCH region. The format index 15 may indicate that PDCCH is not included in the PDCCH region.

Dynamic Time Division Duplex (TDD)

The SFI may be sent in a slot where dynamic change of transmission direction is supported or allowed. For example, as illustrated in FIG. 17, a slot that is designated as a downlink slot by the current TDD configuration may be dynamically changed to an uplink slot by setting the SFI of the slot to an appropriate value of the format index. This implies that in at least some embodiments the transmission direction of a slot without an SFI cannot be changed.

If there is no SFI in a slot (e.g., UL only), the transmit direction of the slot may be determined by the most recently transmitted SFI.

For the base station (e.g., gNB), the degree of dynamicity and efficiency depends on how often SFI is sent. For example, FIG. 18 illustrates a very dynamic scenario while FIG. 19 illustrates a less dynamic scenario.

SFI Based on Generalized Format

Figure 20:
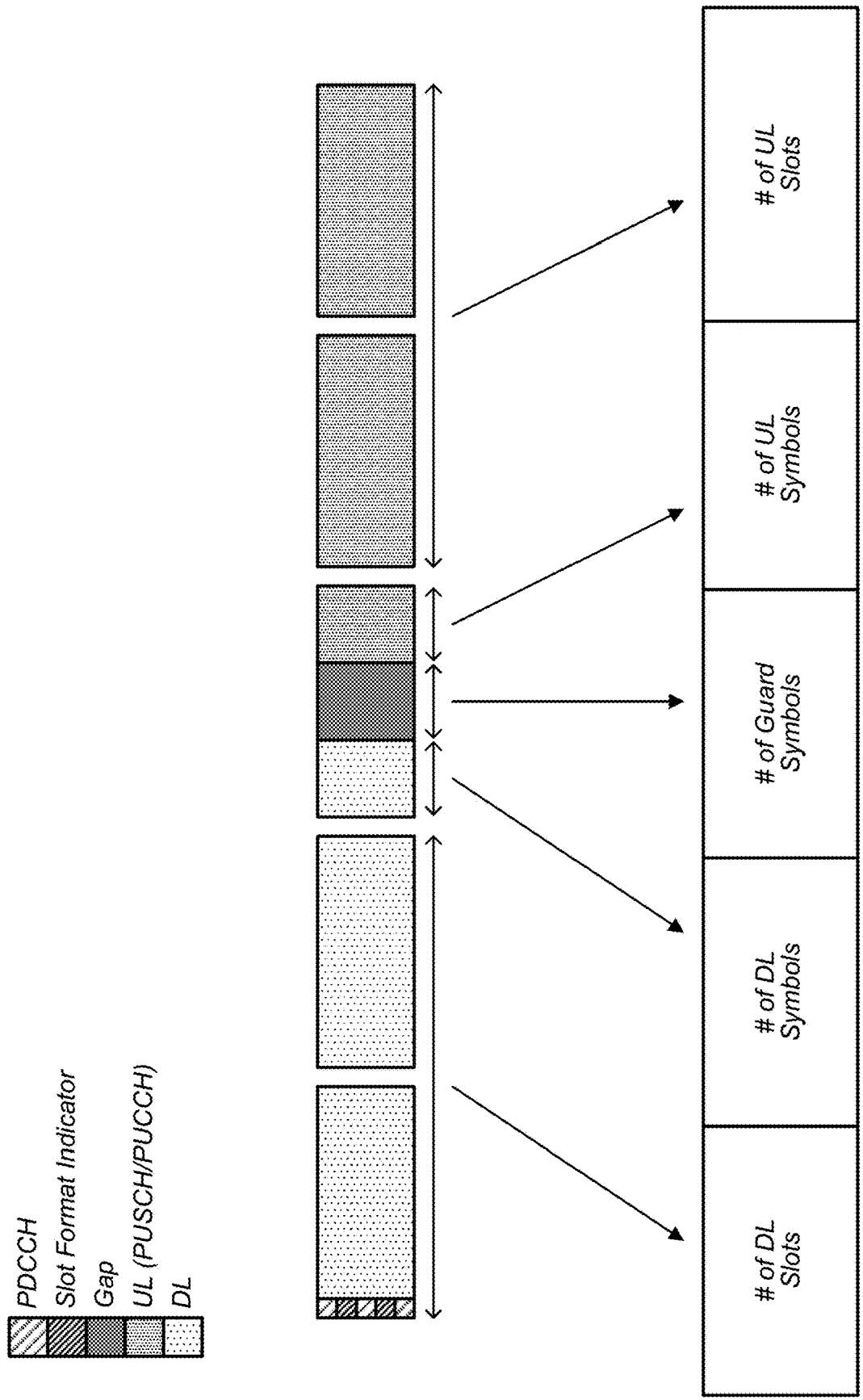
FIG. 20 illustrates exemplary fields of SFI, according to some embodiments.

In some embodiments, the slot format indicator (SFI) may indicate both aggregation levels and number of symbols for all possible formats: downlink only, uplink centric, DL-UL combination. As shown in FIG. 20, the SFI may have five fields. Two of the fields define the length of a downlink region. Two of the fields define the length of an uplink region. One of the fields defines the length of a gap region between the downlink region and the uplink region. The boundaries between slots are not required to occur that slot boundaries.

In some embodiments, the gap region is assumed to occupy at most one whole slot. Thus, in these embodiments, only a number of symbols is needed to specify the length of the gap region.

The downlink region may occur after (e.g., immediately after) the PDCCH region of the initial slot of the aggregated set of slots. (The PDCCH region is illustrated in FIG. 20 as the column of alternating elements covering the first OFDM symbol.) In some embodiments, the gap region may follow immediately after the downlink region. The uplink region may follow immediately after the gap region.

In some embodiments, the SFI includes the following five fields:

number $N_{DL}$ of DL slots;
number of DL symbols in the $(N_{DL}+1)^{th}$ slot;
number of guard symbols in the $(N_{DL}+1)^{th}$ slot;
number of uplink symbols in the $(N_{DL}+1)^{th}$ slot; and
number of uplink slots.

In embodiments where the UE knows in advance the symbol length of each slot, only two of the middle three numbers (from the list above) may need to be included in the SFI. Various embodiments describe at least three realizations of the SFI corresponding respectively to three possible ways of selected two numbers from the middle three numbers.

Note that this generalized format (or signaling method) may be used for semi-static DL/UL assignment (e.g., TDD configuration in LTE terms) as shown in FIG. 5.

Scheduling with SFI

In some embodiments, the base station (e.g., gNB) can signal slot aggregation semi-statically or dynamically.

Figure 21:
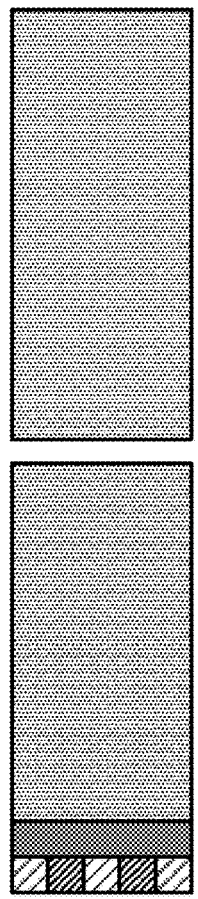
FIG. 21 illustrates UL slot aggregation, according to some embodiments.

In UL slot aggregation, e.g., as shown in FIG. 21, PDCCH is preferably not transmitted in the middle of aggregation, i.e., in the non-initial slot(s) (e.g., the transmission of a PDCCH in a non-initial slot may require the insertion of a gap region to transition back to uplink transmission.)

Figure 22:
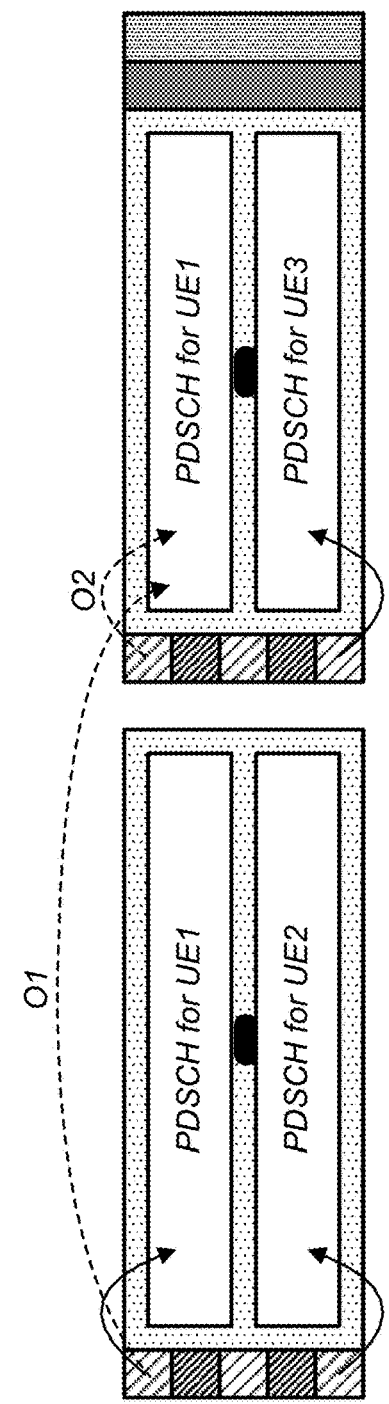
FIG. 22 illustrates DL slot aggregation, according to some embodiments.

In DL, PDCCH could be allowed in the middle of an aggregation, e.g., as shown in FIG. 22. The PDSCH of a UE1 is scheduled in the first slot and lasts until the end of the aggregated slot (i.e., the second slot). In a first option, a single PDCCH in the first slot could indicate the PDSCH for UE1 in every slot. In a second option, a PDCCH in each slot independently schedules PDSCH for UE1 in that slot. The PDSCH of a UE2 is scheduled in the first slot only. The PDSCH of a UE3 is scheduled in the second slot only.

Rate Matching in PDCCH Region

In some embodiments, when a PDSCH is scheduled over multiple aggregated slots, the PDSCH is never mapped at into PDCCH region (or control resource set). In other words, elements of the PDSCH may not be allowed to be transmitted in the PDCCH region. In FIGS. 23 and 24, note that the PDSCH for UE1 may never occur in the PDCCH region (the first OFDM symbol) of any slot.

In other embodiments, when a PDSCH is scheduled over multiple aggregated slots, the PDSCH is not mapped into PDCCH region (or control resource set), as shown in FIG. 25. However, as shown in FIG. 26, if there is no PDCCH scheduled in a non-first slot, then the SFI in the non-first slot may signal that there is no PDCCH in the PDCCH region of the non-first slot, and the PDSCH for UE1 could be mapped at least partially into the PDCCH region of the non-first slot, to minimize waste of time frequency resources.

SFI for Slots of Various Different Lengths

In some embodiments, the same slot format indicator could be used in contexts where the slots are seven symbols in length and contexts were the slots are 14 symbols in length.

For uplink (UL), shown in FIG. 27, the number of symbols for PDCCH and the length of gap is known. Thus, the number of UL symbols may be calculated, e.g., based on the equation:

No. of UL symbols=Symbol length of slot–gap length–PDCCH length.

For downlink (DL), shown in FIG. 28, since the SFI indicates the number of UL symbols (if an uplink region exists within the slot), it is straight forward to compute the number of DL symbols for DL(-centric) slots, e.g., based on the equation:

No. of DL symbols=Symbol length of slot–(gap length+number of UL symbols)(UL Present=True)

In some embodiments, the SFI could be transmitted in mini-slots, to dynamically indicate the direction of each SFI-containing mini-slot.

In one set of embodiments, a method 2900 for operating a base station may include the operations shown in FIG. 29.

At 2910, the method may include transmitting, by a radio of the base station, a first slot format indicator (SFI) within a first slot of a radio frame. The first SFI may indicate a first transmission direction for at least a first portion of the first slot. In some embodiments, the first transmit direction may either be uplink transmission or downlink transmission. The SFI may be included in a group common PDCCH of a PDCCH region of the first slot. The PDCCH region may span the first N symbol durations of the first slot, where N is greater than or equal to one. In some embodiments, the integer N is equal to one.

The first SFI may indicates that the PDCCH region includes at least one PDCCH. Alternatively, the first SFI may indicate that the PDCCH region does not include a PDCCH, and thus, a UE may save power by not attempting to decode (or search for) a PDCCH.

In some embodiments, the first SFI also indicates a second transmit direction for a second portion of the first slot, wherein the second transmit direction is a direction opposite to the first transmit direction. For example, the first portion may be a downlink portion and the second portion may be an uplink portion.

In some embodiments, the first SFI also indicates a second transmit direction for at least a portion of a second slot, wherein the second slot follows immediately after the first slot, wherein the second transmit direction is a direction opposite to the first transmit direction.

In some embodiments, when the first transmit direction is uplink transmission, the first SFI may indicate a slot aggregation level for the uplink transmission.

In some embodiments, when the first transmit direction is downlink transmission, an extent of slot aggregation for the downlink transmission may be indicated in a DCI of a radio frame containing the first slot.

In some embodiments, when the first transmit direction is downlink transmission, the first SFI may indicate a slot aggregation level for the downlink transmission.

The SFI could be divided into two parts (transmission direction and aggregation level), and encoded separately.

In some embodiments, the method may also include transmitting, by the radio, a second SFI in a second slot of the radio frame, wherein the second slot follows immediately after the first slot. The second SFI may indicate a second transmit direction for at least a portion of the second slot. The second transmit direction is either uplink transmission or
downlink transmission. The second SFI may be included in a group common PDCCH of a PDCCH region of the second slot.

In some embodiments, the second SFI may indicate that the PDCCH region of the second slot does not include a PDCCH.

In some embodiments, the method may also include transmitting, by the radio of the base station, a second SFI in a second slot of the radio frame, wherein the second SFI indicates that at least a portion of the second slot is blank, wherein the second SFI is included in a group common PDCCH of a PDCCH region of the second slot.

In some embodiments, the method may also include transmitting, by the radio, a second SFI in a second slot of the radio frame, wherein the second SFI indicates that at least a portion of the second slot is to be used for a side link (such as UE to UE, or V2X), wherein the second SFI is included in a group common PDCCH of a PDCCH region of the second slot.

In some embodiments, the slot may be two or 7 or 14 symbols in length.

In one set of embodiments, a method 3000 for operating a user equipment (UE) device may include the operations shown in FIG. 30.

At 3010, a radio of the UE device may receive a first slot format indicator (SFI) from a first slot of a radio frame, wherein the first SFI indicates a first transmission direction for at least a first portion of the first slot, wherein the first transmit direction is either uplink or downlink. The SFI is included in a group common PDCCH of a PDCCH region of the first slot, wherein the PDCCH region spans the first N symbol durations of the first slot, wherein N is greater than or equal to one.

In some embodiments, the method may also include performing uplink transmission or downlink reception in the first portion of the first slot based on the first transmission direction. In other words, the UE radio performs uplink transmission if the first transmission direction is uplink, and performs downlink reception if the first transmission direction is downlink.

In some embodiments, the integer N is equal to one.

In some embodiments, the method may also include: in response to determining that the SFI indicates the PDCCH region of the first slot includes at least one PDCCH, decoding (or attempting to decode) the PDCCH from the PDCCH region.

In some embodiments, the method may also include: in response to determining that the first SFI indicates the PDCCH region does not include a PDCCH, omitting an attempt to decode PDCCH information from the PDCCH region.

In some embodiments, the method may also include: in response to determining that the first SFI indicates a second transmit direction for a second portion of the first slot, performing downlink reception or uplink transmission in the second portion of the first slot based on second transmit direction, wherein the second transmit direction is a direction opposite to the first transmit direction.

In some embodiments, the first SFI also indicates a second transmit direction for at least a portion of a second slot, wherein the second slot follows immediately after the first slot, wherein the second transmit direction is a direction opposite to the first transmit direction.

In some embodiments, the first transmit direction is uplink transmission, wherein the first SFI indicates a slot aggregation level for uplink transmission.

In some embodiments, the first transmit direction is downlink transmission, wherein an extent of slot aggregation for the downlink transmission is indicated in a DCI of a radio frame containing the first slot.

In some embodiments, the first transmit direction is downlink transmission, wherein the first SFI indicates a slot aggregation level for downlink transmission.

The SFI could be divided into two parts (transmission direction and aggregation level), and encoded separately.

In some embodiments, the method may also include receiving, by the radio of the UE device, a second SFI in a second slot of the radio frame, wherein the second slot follows immediately after the first slot, wherein the second SFI indicates a second transmit direction for at least a portion of the second slot, wherein the second transmit direction is either uplink transmission or downlink transmission, wherein the second SFI is included in a group common PDCCH of a PDCCH region of the second slot.

In some embodiments, the method may also include: in response to determining that the second SFI indicates the PDCCH region of the second slot does not include a PDCCH, saving power by making no attempt to decode PDCCH information from the PDCCH region of the second slot.

In some embodiments, the method may also include; receiving, by the radio of the UE device, a second SFI in a second slot of the radio frame; and in response to determining that the second SFI indicates that at least a portion of the second slot is blank, disabling uplink transmission or downlink reception in said at least a portion of the second slot, wherein the second SFI is included in a group common PDCCH of a PDCCH region of the second slot In some embodiments, the method may also include: receiving, by the radio, a second SFI in a second slot of the radio frame, performing a side link transmission in at least a portion of the second slot in response to determining that the second SFI indicates said at least a portion is to be used for a side link, wherein the second SFI is included in a group common PDCCH of a PDCCH region of the second slot.

In some embodiments, the slots are two or 7 or 14 symbols in length.

Figure 31:
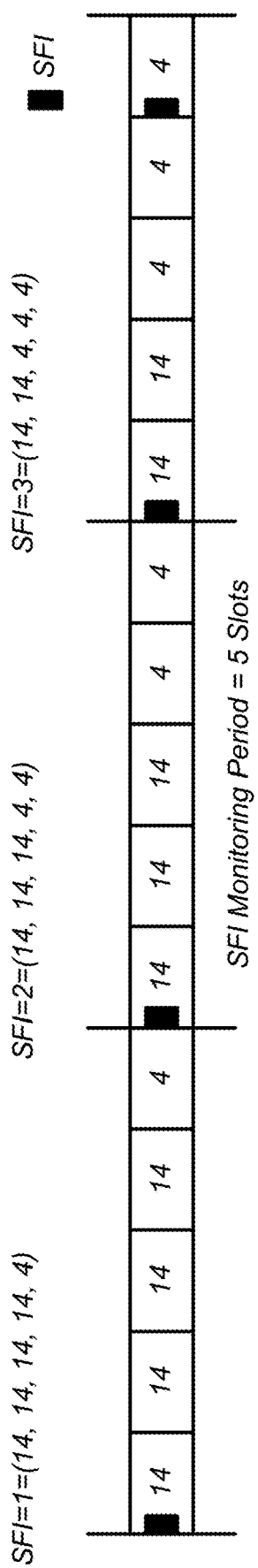
FIG. 31 illustrates exemplary provision of SFI having a 5 slot period, according to some embodiments.

FIG. 31—Periodic SFI

As shown in FIG. 31, an SFI may be sent periodically by the network to indicate slot formats for one or more slots. As described in more detail below, the SFI may refer to a value (e.g., an index of a UE table configured for or provided to the UE). The value may indicate one or more sets of directions for symbols, each set corresponding to a slot. In the exemplary embodiment of FIG. 31, the value refers to a table for a monitoring period of 5 slots, where the SFI is provided every five slots. For example, in the embodiment shown, the provided SFI value for the first monitoring period is 1, which may refer to format of 14 for each of the first four slots and 4 for the final slot. In the second period, the provided SFI value may be 2, indicating a format of 14 for the first three slots and 4 for the final two slots. In the third period, the provided SFI may have a value of 3, indicating a format of 14 for the first two slots and 4 for the final 3. In some embodiments, this exemplary period and values may correspond to the exemplary UE table of FIG. 41.

In order to provide the SFI values in an efficient way, the possibilities of the directions of each symbol in a slot may be enumerated. For example, in embodiments where the number of symbols in a slot is 14, the possibilities may be enumerated according to 14 symbol possibilities and/or 7 symbol possibilities (e.g., which may be combined to generate 14 symbol possibilities.

Where 14 symbol possibilities are enumerated, the total number of symbols is 14. There may be X number of downlink (DL) symbols, Y number of unknown (U) symbols, and Z number of uplink (UL) symbols, where X+Y+Z=14.

Figures 32A, 32B:
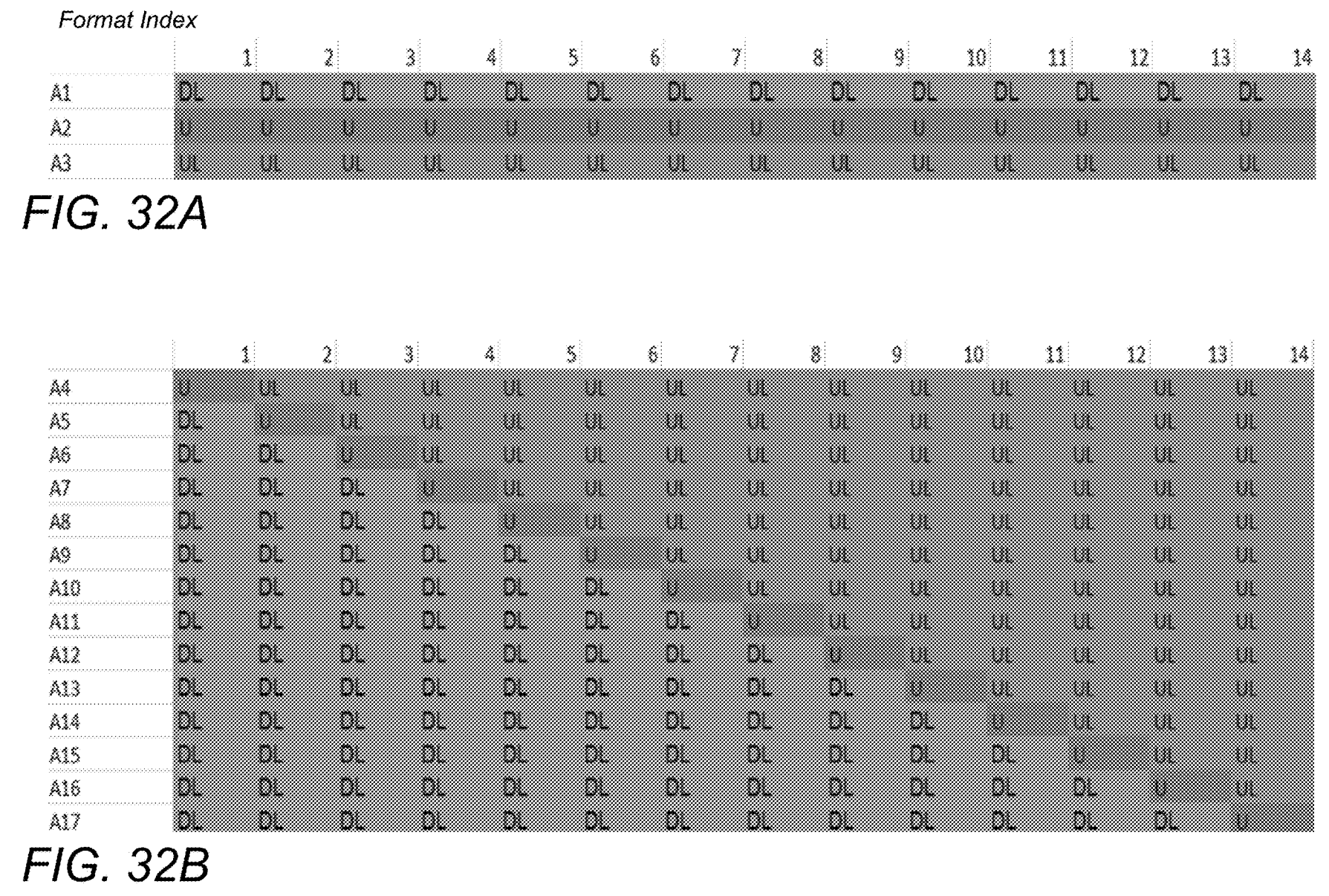
Figure 32C:
FIGS. 32A-32N illustrate 14 symbol, non-repeating possibilities for slots, according to some embodiments.
Figure 32D:
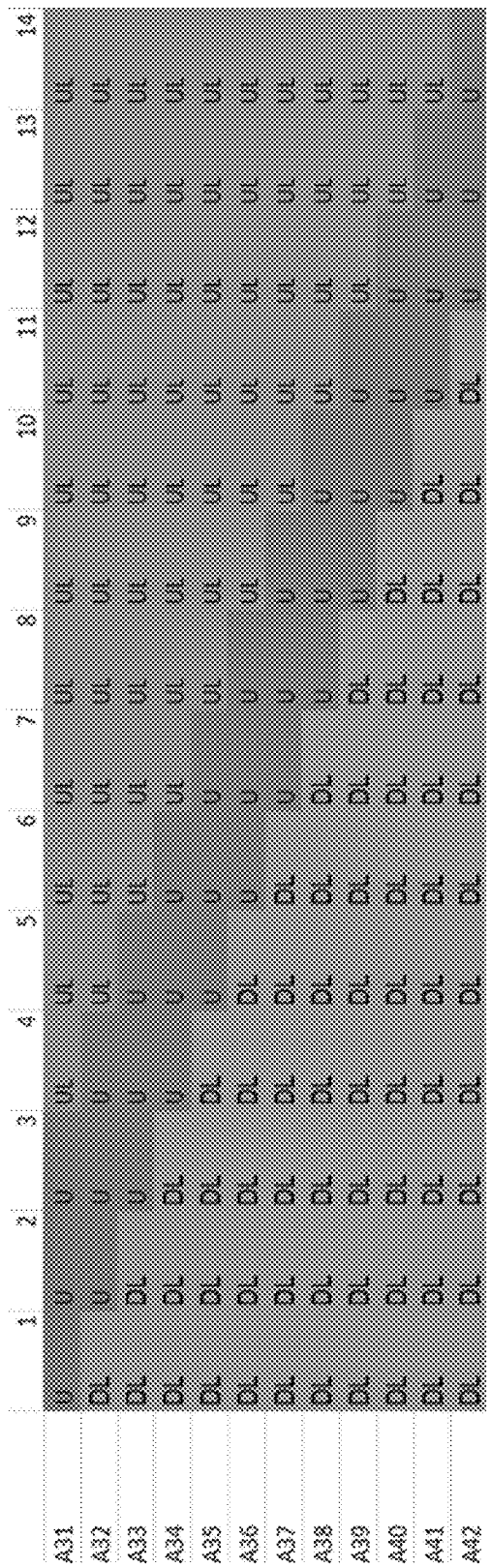
Figure 32E:
Figure 32F:
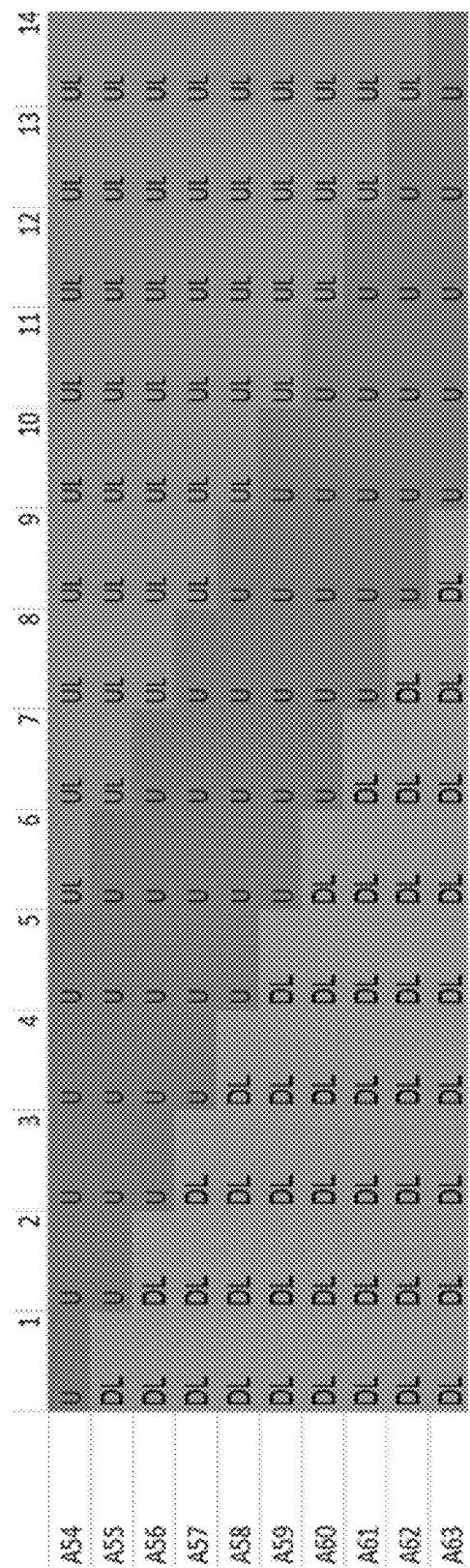
Figure 32G:
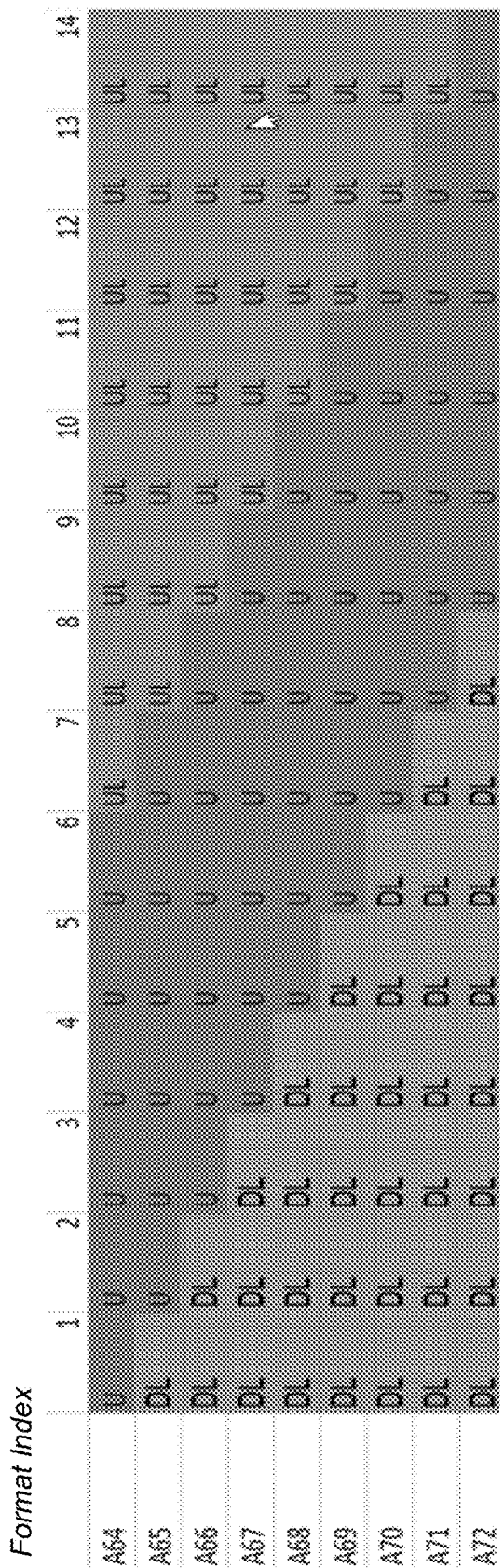
Figure 32H:
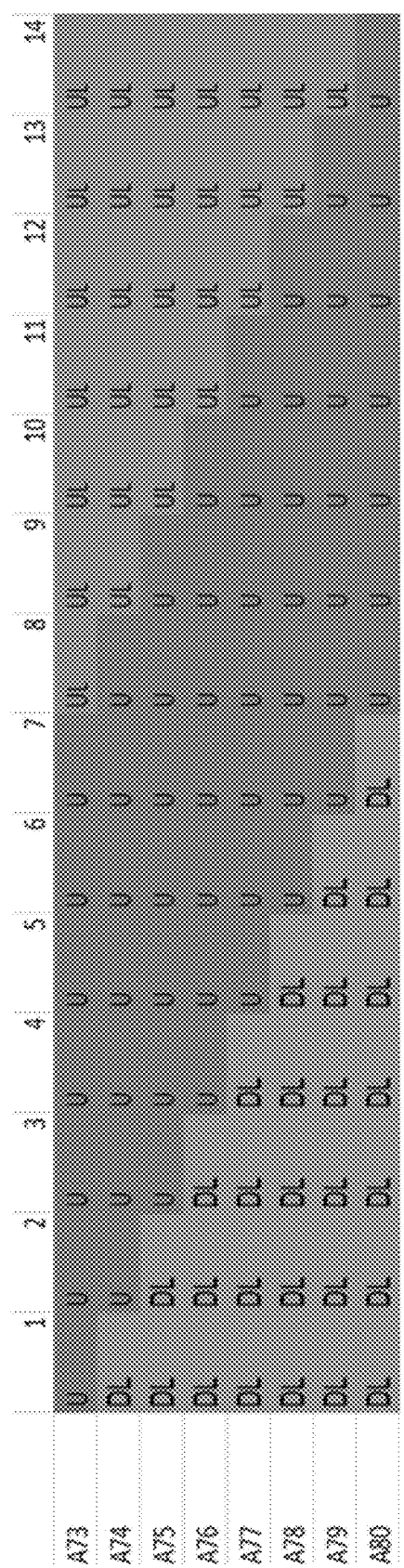
Figure 32I:
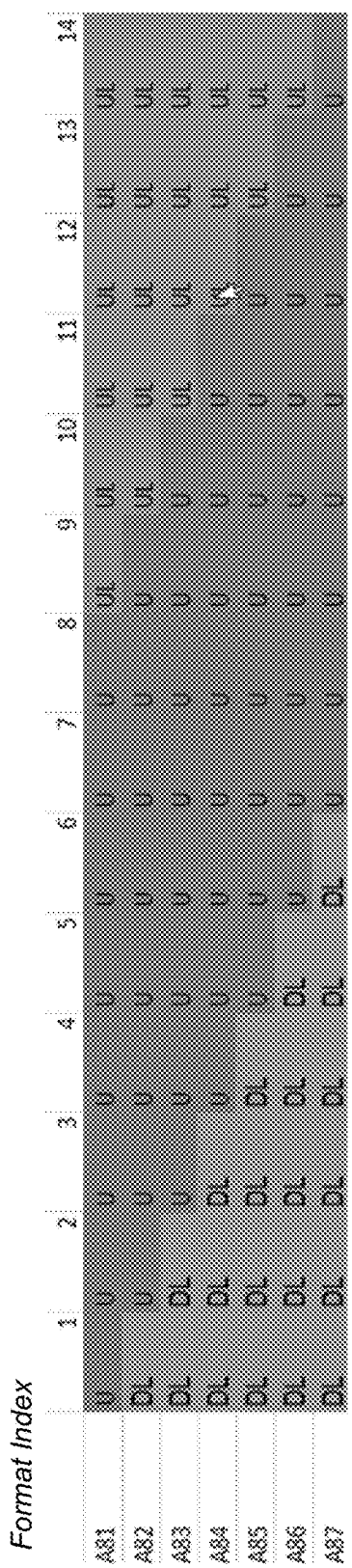
Figure 32J:
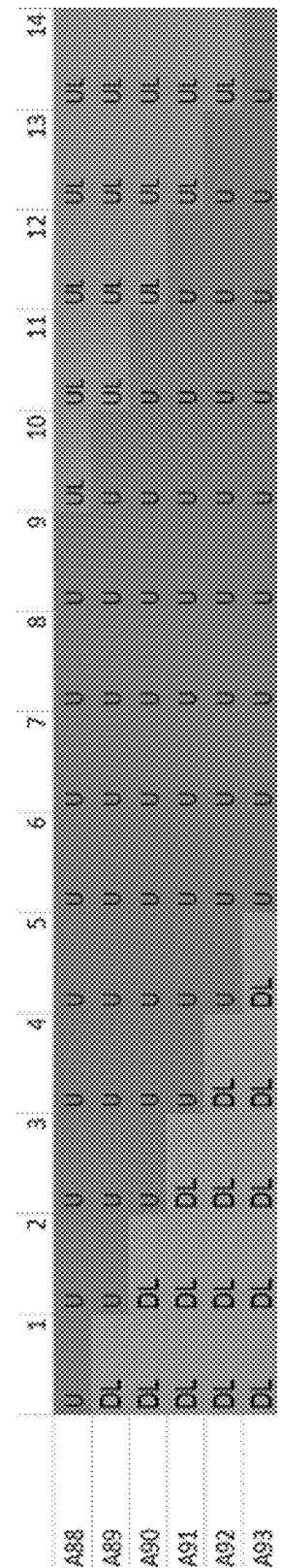
Figure 32K:
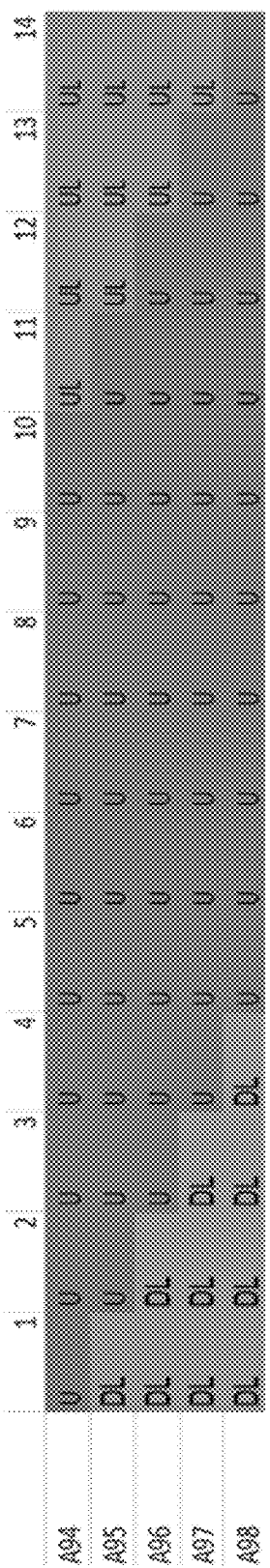
Figure 32L:
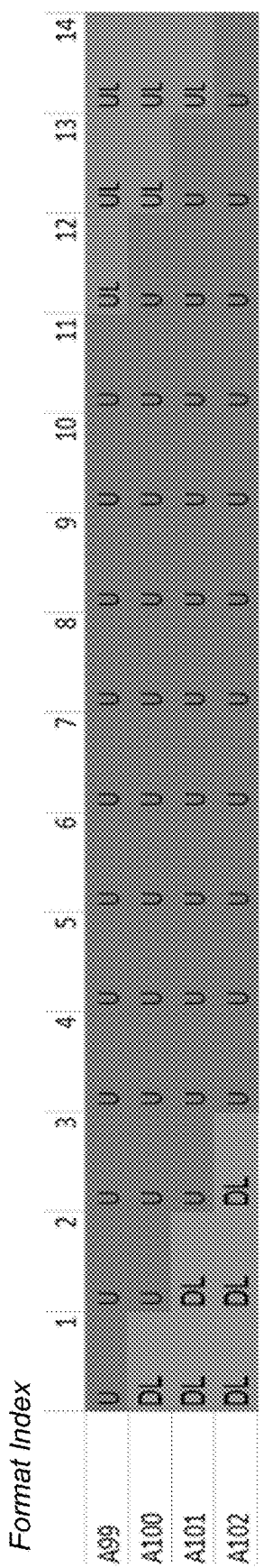
Figure 32M:
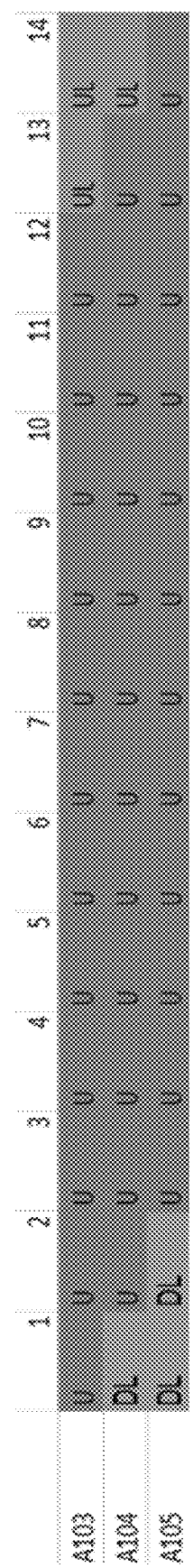
Figure 32N:
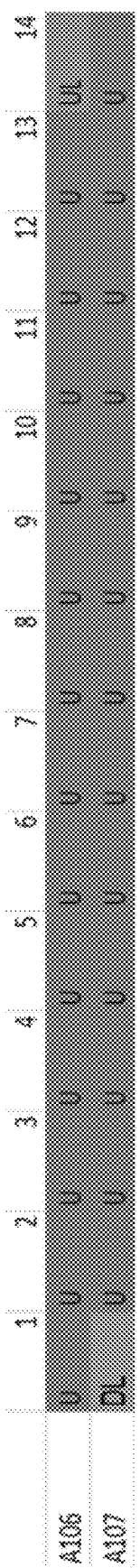

FIGS. 32A-32N illustrate the 14-slot possibilities having 0 or 1 switching points, no repetition and a varying number of unknown symbols. In particular, FIG. 32A illustrates the possibilities (A1-A3) for 14 symbols, 0 switching, 0 unknown symbols, and no repetition (assumed for the remainder of FIGS. 32A-32N). Thus, there are three possibilities: all DL (format A1), all U (format A2), and all UL (format A3). FIG. 32B illustrates the possibilities (formats A4-A17) for 14 symbols, 1 switching, and 1 unknown. Note that the unknown symbols may provide a buffer when switching from DL to UL (e.g., for UE transitioning), although such a buffer may not be necessary when switching from UL to DL. FIG. 32C illustrates the possibilities (formats A18-A30) for 14 symbols, 1 switching, and 2 unknown. FIG. 32D illustrates the possibilities (formats A31-A42) for 14 symbols, 1 switching, and 3 unknown. FIG. 32E illustrates the possibilities (formats A43-A53) for 14 symbols, 1 switching, and 4 unknown. FIG. 32F illustrates the possibilities (formats A54-A63) for 14 symbols, 1 switching, and 5 unknown. FIG. 32G illustrates the possibilities (formats A64-A72) for 14 symbols, 1 switching, and 6 unknown. FIG. 32H illustrates the possibilities (formats A73-A80) for 14 symbols, 1 switching, and 7 unknown. FIG. 32I illustrates the possibilities (formats A81-A87) for 14 symbols, 1 switching, and 8 unknown. FIG. 32J illustrates the possibilities (formats A88-A93) for 14 symbols, 1 switching, and 9 unknown. FIG. 32K illustrates the possibilities (formats A94-A98) for 14 symbols, 1 switching, and 10 unknown. FIG. 32L illustrates the possibilities (formats A99-A120) for 14 symbols, 1 switching, and 11 unknown. FIG. 32M illustrates the possibilities (formats A103-A105) for 14 symbols, 1 switching, and 12 unknown. FIG. 32N illustrates the possibilities (formats A106-A107) for 14 symbols, 1 switching, and 13 unknown.

Figure 33A:
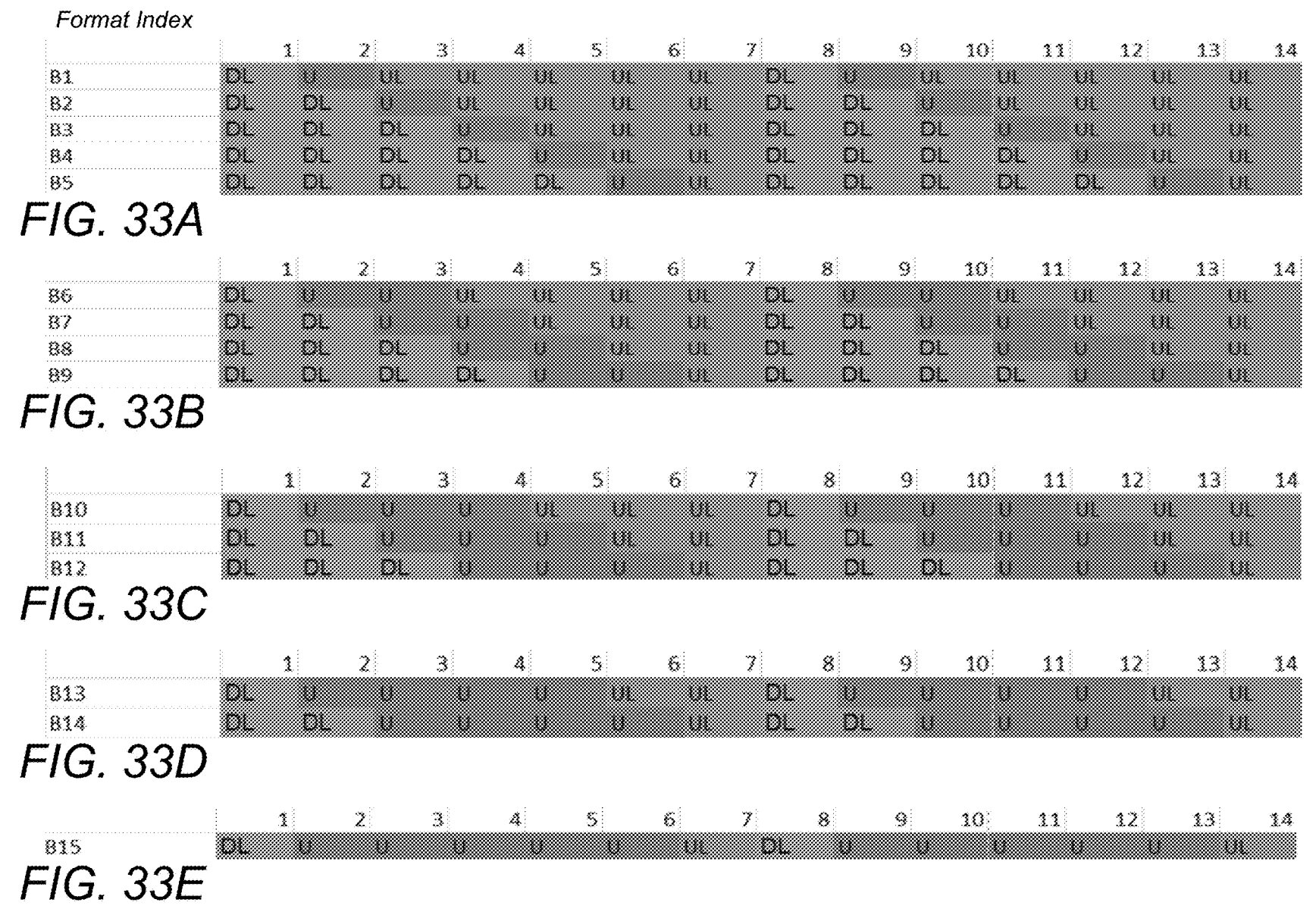

FIGS. 33A-33E illustrate the 14-slot possibilities using repeating 7-slots (two switching points) and a varying number of unknown symbols. In particular, FIG. 33A illustrates the possibilities (formats B1-B5) for 14 symbols, 2 switching, and 2 unknown. FIG. 33B illustrates the possibilities (formats B6-B9) for 14 symbols, 2 switching, and 4 unknown. FIG. 33C illustrates the possibilities (formats B10-B12) for 14 symbols, 2 switching, and 6 unknown. FIG. 33D illustrates the possibilities (formats B13-B14) for 14 symbols, 2 switching, and 8 unknown. FIG. 33E illustrates the possibility (format B15) for 14 symbols, 2 switching, and 10 unknown. As noted above, in these Figures, there is no buffer U symbol when switching from UL to DL, although such possibilities are also envisioned.

Figures 34A, 34B, 34C:
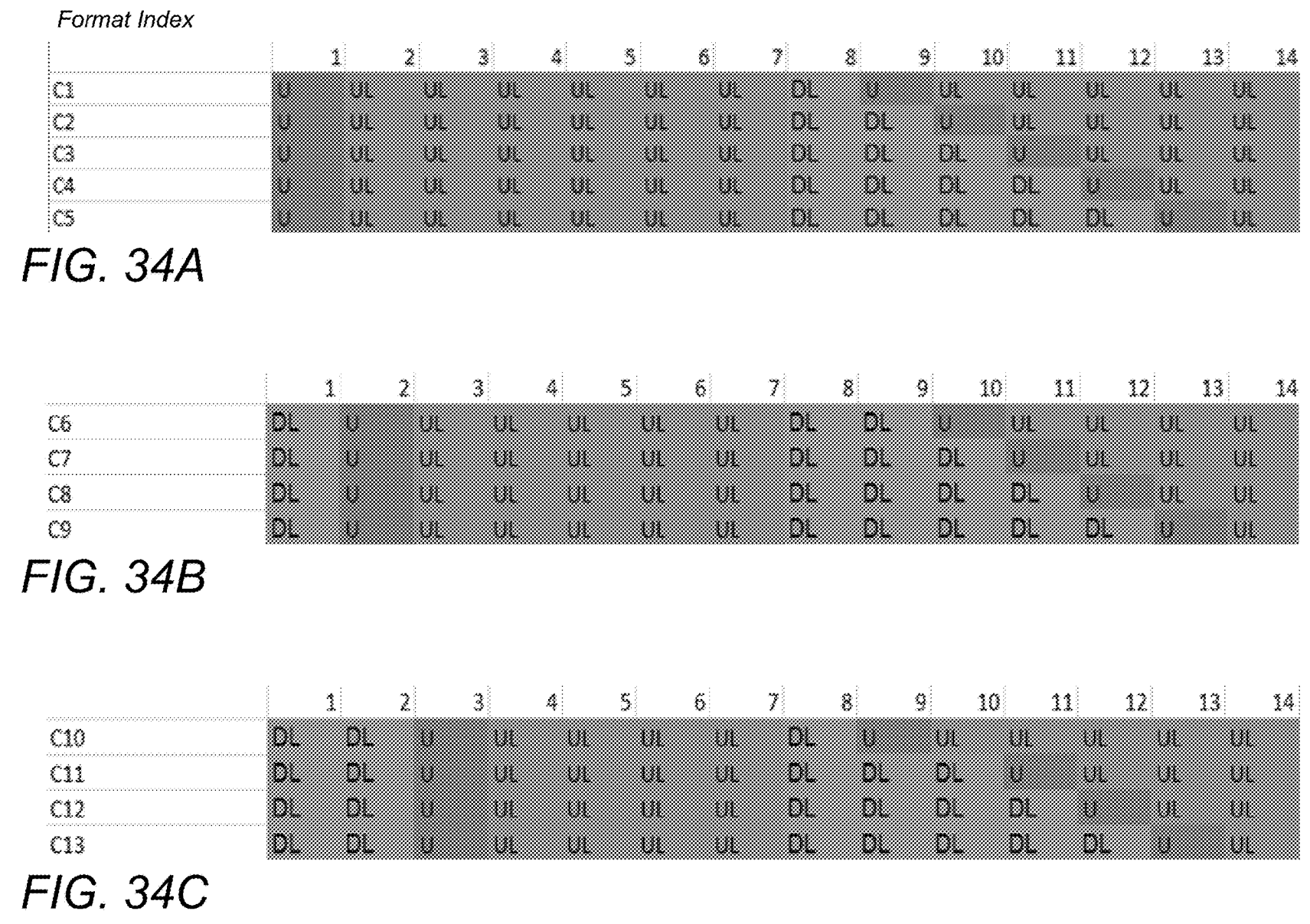
Figures 34D, 34E, 34F:
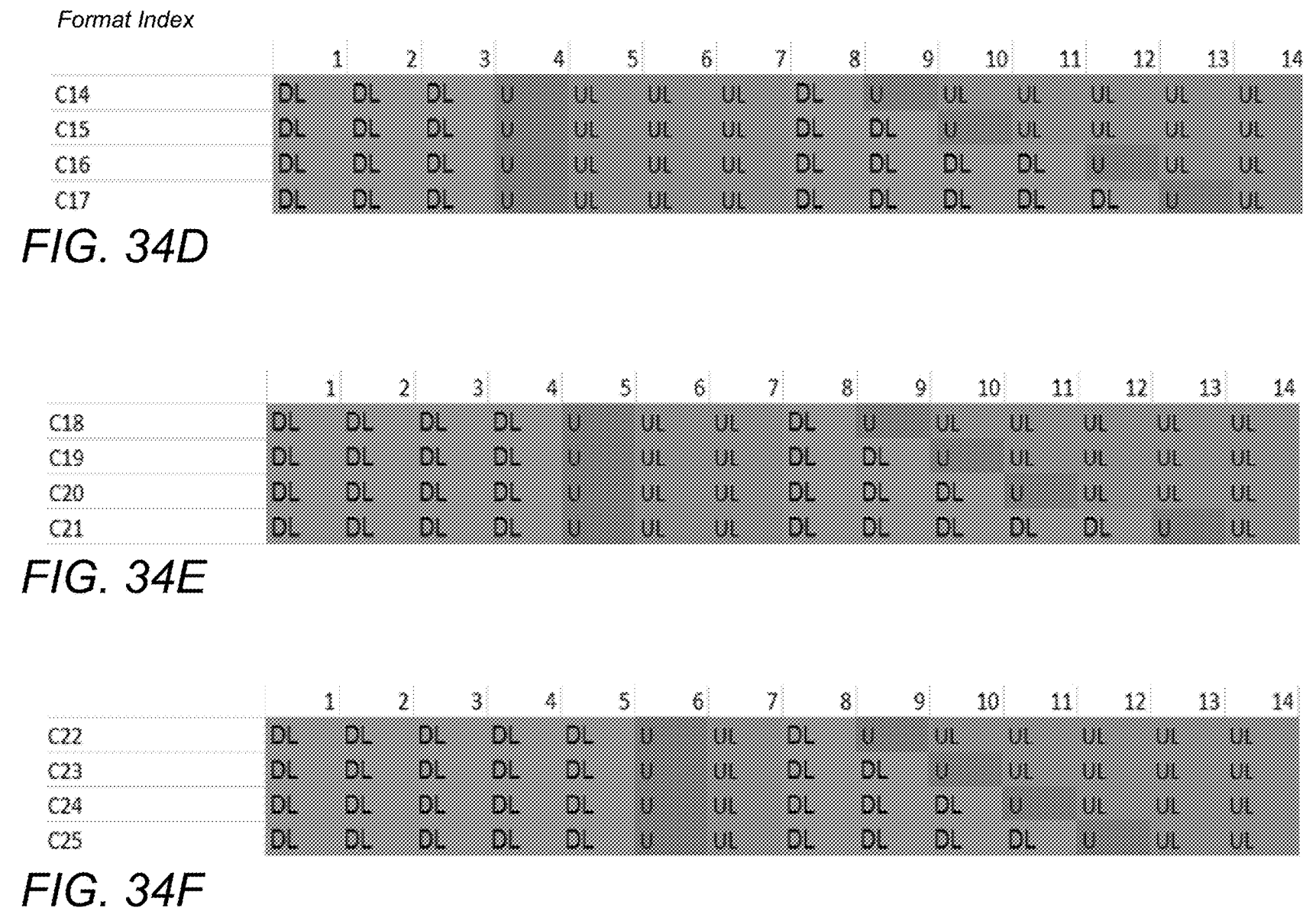
Figures 34G, 34H, 34I:
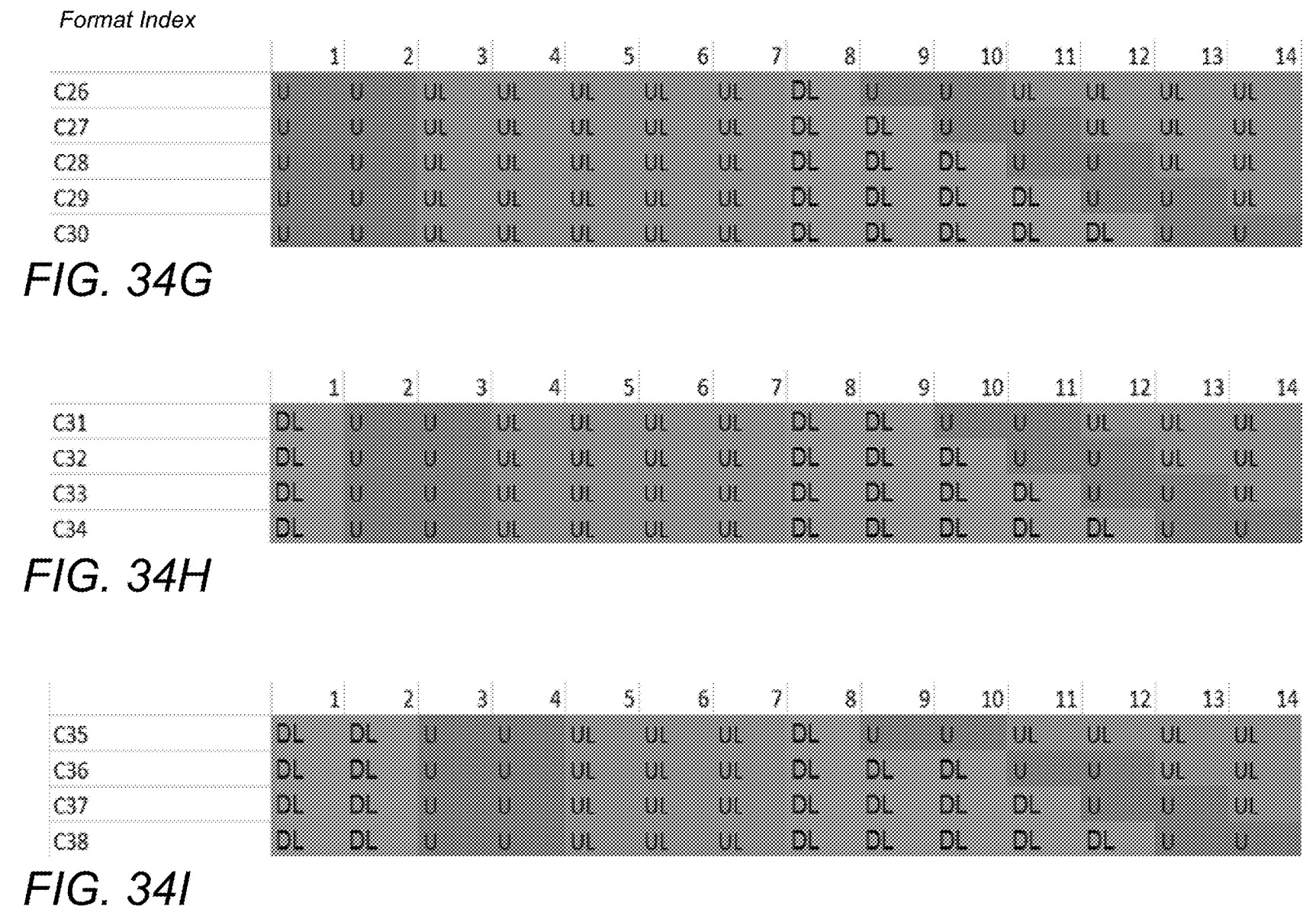
Figures 34S, 34T, 34U:
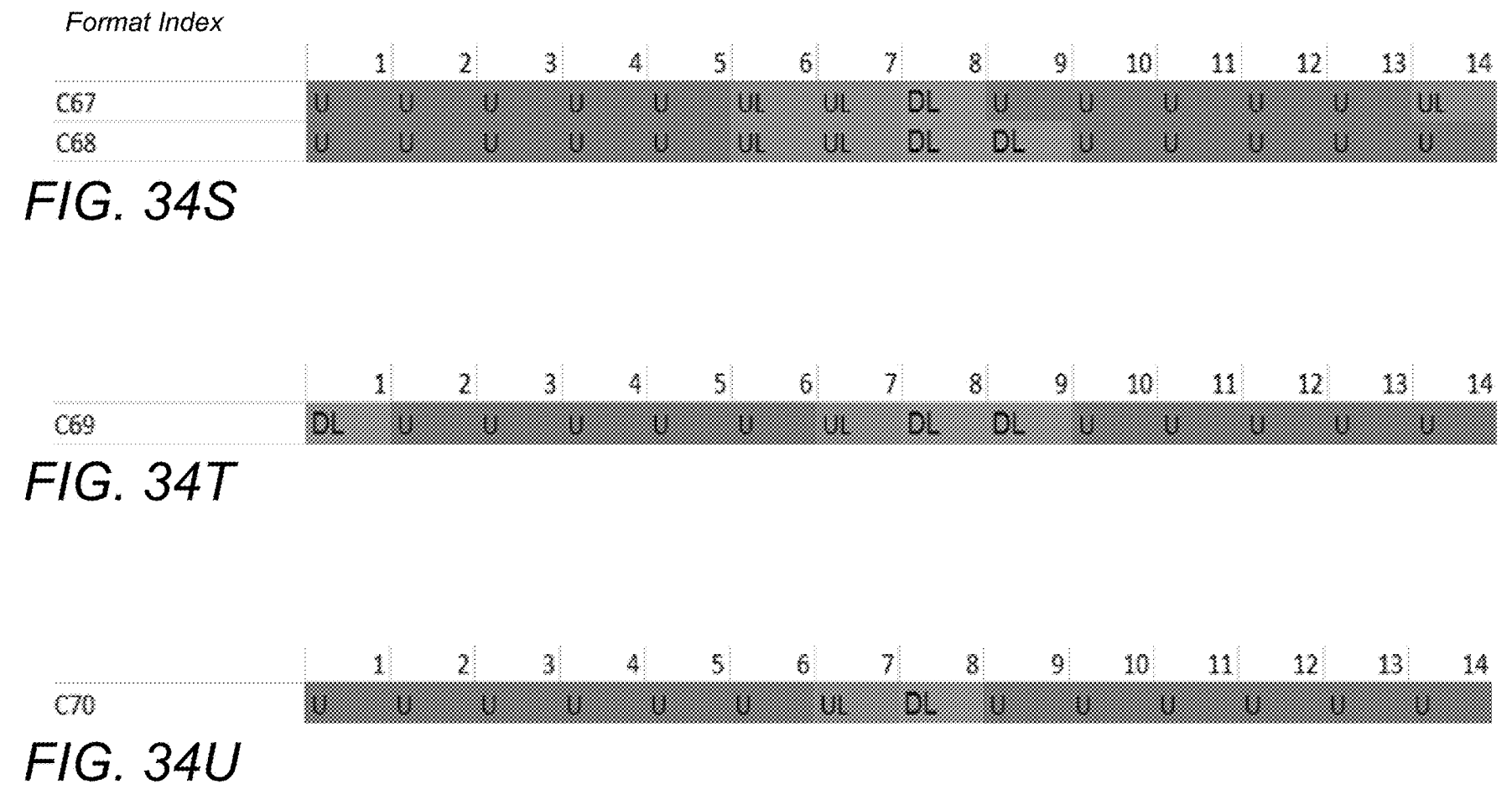

FIGS. 34A-34U illustrate the 14-slot possibilities having 2 switching points (two sets of 7 symbols) and without repetition. In particular, FIGS. 34A-34F illustrate the possibilities (formats C1-C25) for 14 symbols, 2 switching, and 2 unknown. FIGS. 34G-34K illustrate the possibilities (formats C26-C46) for 14 symbols, 2 switching, and 4 unknown. FIGS. 34L-34O illustrate the possibilities (formats C47-059) for 14 symbols, 2 switching, and 6 unknown. FIGS. 34P-34R illustrate the possibilities (formats C60-C66) for 14 symbols, 2 switching, and 8 unknown. FIGS. 34S-34T illustrate the possibilities (formats C67-C69) for 14 symbols, 2 switching, and 10 unknown. FIG. 34U illustrates the possibility (format C70) for 14 symbols, 2 switching, and 12 unknown. As noted above, in these Figures, there is no buffer U symbol when switching from UL to DL, although such possibilities are also envisioned.

Figures 35C, 35D:
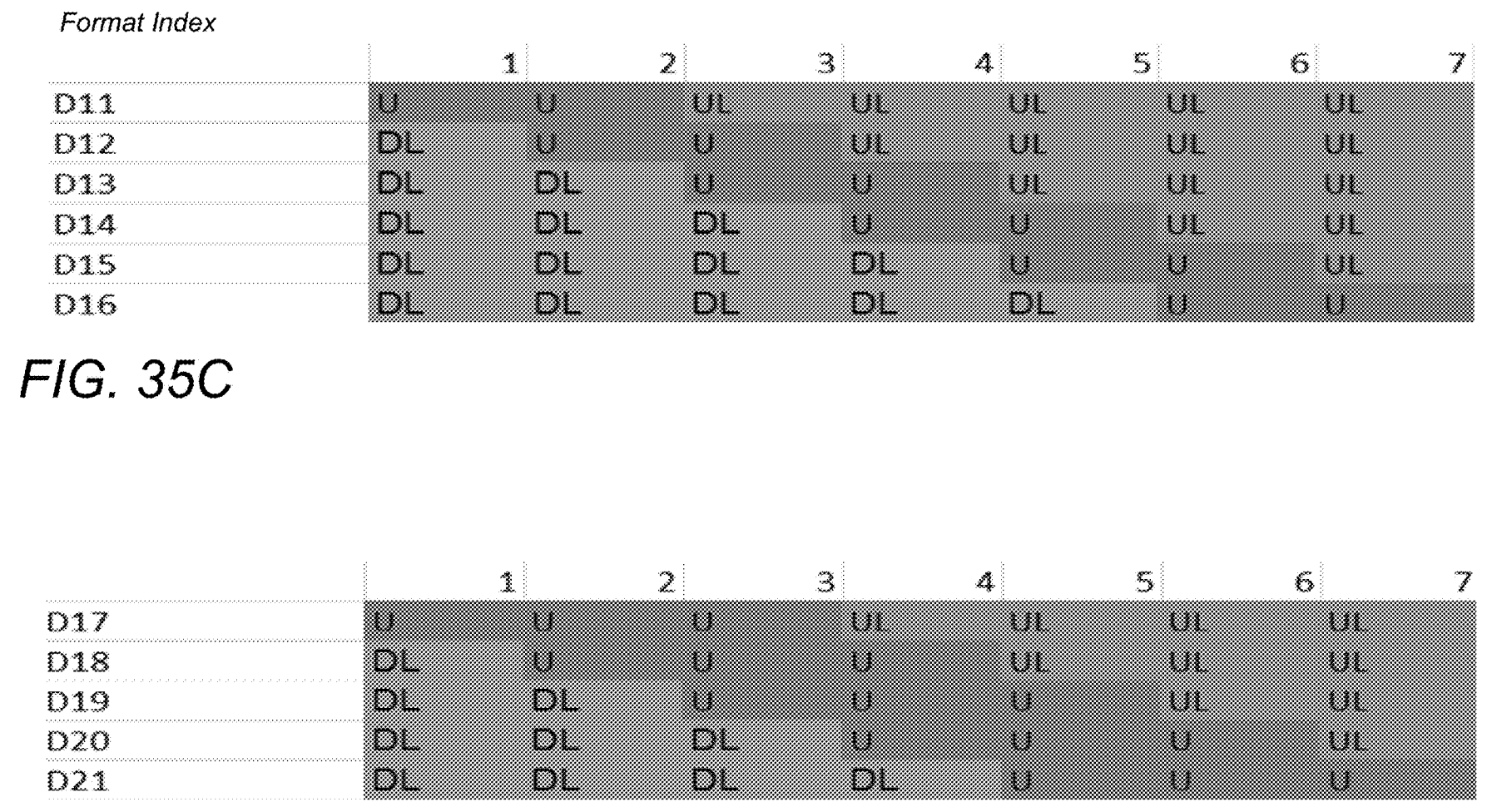

FIGS. 35A-35G illustrate the 7-slot possibilities (which can be combined to form 14 slot possibilities) with 0 and 1 switching points and no repetition. Similar to the 14 slot possibilities, the total number of symbols are 7; accordingly, X is the number of DL symbols, Y is the number of unknown symbols, and Z is the number of UL symbols, so X+Y+Z=7. FIG. 35A illustrates the possibilities (D1-D3) for 7 symbols and 0 switching. FIG. 35B illustrates the possibilities (D4-D10) for 7 symbols, 1 switching, and 1 unknown. FIG. 35C illustrates the possibilities (D4-D10) for 7 symbols, 1 switching, and 2 unknown. FIG. 35D illustrates the possibilities (D11-D16) for 7 symbols, 1 switching, and 3 unknown. FIG. 35E illustrates the possibilities (D22-D25) for 7 symbols, 1 switching, and 4 unknown. FIG. 35F illustrates the possibilities (D26-D28) for 7 symbols, 1 switching, and 5 unknown. FIG. 35G illustrates the possibilities (D29-D30) for 7 symbols, 1 switching, and 6 unknown.

FIGS. 36-38—Single Slot Formats

The various enumerated possibilities discussed above may be used to specify single slot formats (e.g., having 14 OFDM symbols). For example, FIG. 36 illustrates a first manner of enumerating single slot formats, based on 14-symbol formats only (e.g., corresponding to FIGS. 32A-34U. In this case, a single slot format index (starting at index 0 and proceeding to index 193) may specify the format by referring to the format index shown in FIGS. 32A-34U. For example, in FIG. 36, the single slot format index of 0 corresponds to format A1 of FIG. 32A (all DL). Similarly, index 111 refers to B3 of FIG. 33A (DL, DL, DL, U, UL, UL, UL, DL, DL, DL, U, UL, UL, UL).

As another possibility, FIG. 37 constructs the single slot format table based on both 14-symbols and 7-symbols formats. In particular, the first part of the table may correspond to formats in FIGS. 32A-N and second part correspond to formats in 35A-G (where 0-106 are the same as FIG. 36, but the remaining single slot formats (107-191 are specified as combinations of the 7 slot formats of FIGS. 35A-G). For example, 191 of FIG. 36 is specified as C70, which is the same as 191 of FIG. 37, specified as the combination of D29 and D30.

As a further possibility, the entire table may be specified as combinations of 7 slot formats, as shown in FIG. 38.

Note that these three Figures are exemplary only and other single slot format tables are envisioned. In some embodiments, a table similar to one of these tables may be specified in a future 3GPP specification, e.g., corresponding to LTE or 5G NR.

FIGS. 39-41—UE SFI Tables

UE tables may be constructed as a subset of a single slot formats table, such as one of those in FIGS. 36-38. For example, the UE table may select a small number of single slot formats (or sets of single slot formats) that may be selected during transmission. In some embodiments, this table may be selected by the network (e.g., the base station) and provided or indicated to the UE. The table may be the unique to each UE, apply to subsets of UEs, apply to all UEs, apply to different types of UEs (e.g., where UEs of each of a particular vendor or model number have a different UE table), or other possibilities.

In some embodiments, each entry in UE (e.g., a user-specific) table could have a sequence of SFI index values which is for one or more of slots. The size of this table may vary and may determine the bit length of the SFI (length (SFI)=ceil(log 2(size of UE table)). Accordingly, upon agreeing to use of such a table, the network may indicate one of the SFI indices in the UE table via SFI.

FIG. 39 illustrates an exemplary UE table for an SFI period of 1 slot. In this example, an SFI value of 0 indicates use of the single slot format 0 (corresponding to A1 with all DL direction symbols) for an upcoming slot. As shown, however, the SFI value may specify more than a single slot if desired, although other embodiments where only single slot formats are provided for each UE table index value. In particular, in FIG. 39, SFI values of 1-7 indicate multiple slot formats for more than a single upcoming slot. For example, SFI 1 corresponds to using slot format 5 (corresponding to A6) on two consecutive upcoming slots. SFI 3-6 specify the formats for 3 upcoming slots, and SFI 7 specifies the formats for 4 upcoming slots. In some embodiments, when multiple slots are specified, but a new SFI value is provided within a shorter period (e.g., in this case every slot), new values may be compatible with previously provided SFI values.

FIG. 40 illustrates an exemplary UE table for an SFI period of 2 slots. SFI values 0-2 specify the upcoming 2 slots, values 3-6 specify 4 slots, and value 7 is unused.

FIG. 41 illustrates an exemplary UE table for an SFI period of 5 slots. In this example, SFI values 0-5 specify 5 slots and values 6-7 specify 10 slots.

Figure 42:
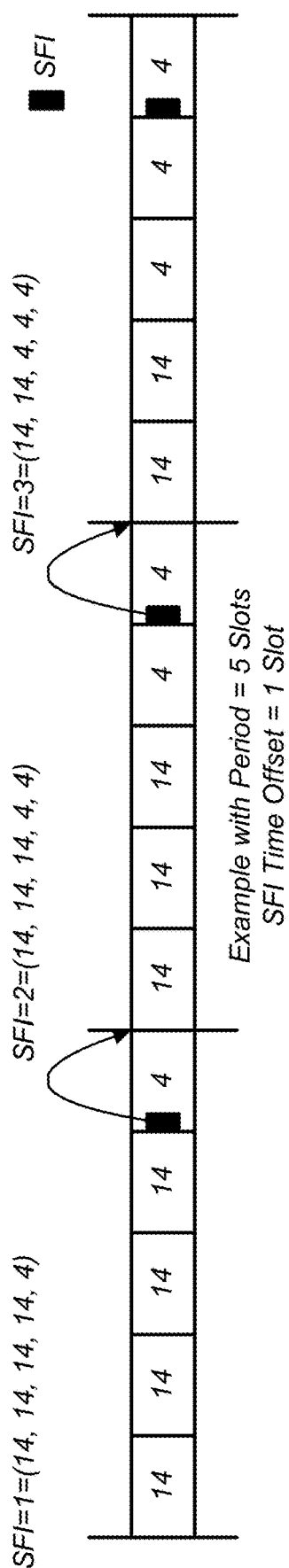
FIG. 42 illustrates exemplary provision of SFI having a five slot period with a one slot offset, according to some embodiments.

FIG. 42 illustrates an exemplary SFI provision with an offset. In this embodiment, the SFI value may be provided earlier than when the SFI value takes effect, e.g., by a known number of symbols or slots. As shown in FIG. 42, the SFI value is provided one slot before it takes effect. For example, the SFI value 2 is provided at the beginning of the $5^{th}$ slot to take effect on the $6^{th}$ slot. In this example, the SFI value 2 corresponds to the exemplary UE table of FIG. 41, and indicates the corresponding 5 slots (6-10) will use the single slot formats 14 (corresponding to A15), 14, 14, 4 (corresponding to A5), and 4.

Thus, in some embodiments, the SFI can be transmitted with timing offset from the time it is applied to give enough time for the UE to decode GC-PDCCH carrying SFI. This offset could be 0, 1, 2, . . . values and may be RRC configured, among other possibilities.

Using SFI values

In some embodiments, a UE is configured to monitor one or more CORESET (COntrol REsource SET) by RRC signaling. A CORESET may be configured in either semi-statically assigned DL or Unknown resource. Accordingly, for a configured CORESET in a slot, if dynamic SFI is not available yet and not mis-detected, then the UE may monitor the CORESET (e.g., for DL transmissions). Similarly, if dynamic SFI indicates DL, then the UE may monitor the CORESET.

In some embodiments, if dynamic SFI indicates Unknown, then the UE may be supposed to monitor its CORESET(s). However, in other embodiments, the UE may be configured to ignore or not monitor CORESET in this case.

If dynamic SFI indicates UL, the UE may perform one of 1) not monitoring the CORESET or 2) monitoring the CORESET, depending on the desired behavior.

In some cases, there may be errors in SFI detection or conflicts between different values (e.g., semi-static assignment, SFI, downlink control information (DCI), among others). For example, the UE may treat any mis-detected SFI as indicating that the symbols are unknown. Following the embodiment above, when unknown, the UE may be configured to monitor CORESET.

Figure 43:
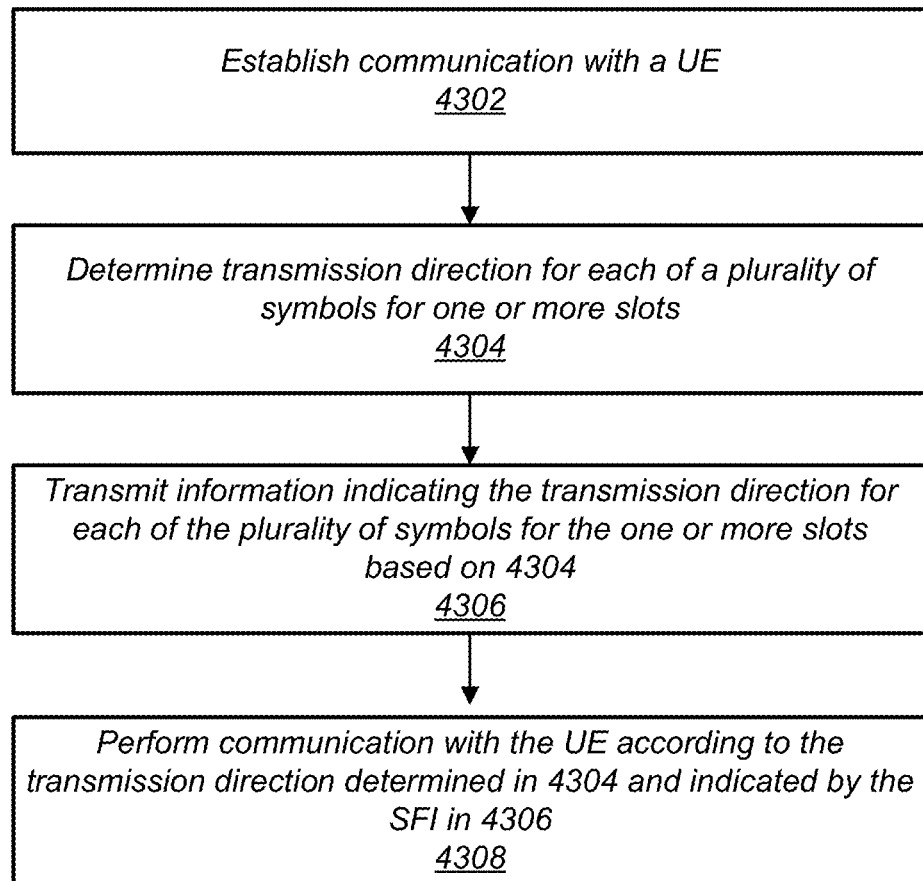
FIG. 43 is a flowchart diagram illustrating an exemplary method of using SFI between a BS and a UE, according to some embodiments.

According to various embodiments, when there are conflicts between different values in transmit direction, the UE may not transmit and/or receive anything in the symbol or slot with the conflict. For example, this behavior may apply when: the semi-static assignment indicates DL for a symbol and SFI indicates Unknown; the semi-static assignment indicates UL and SFI indicates Unknown; the semi-static assignment indicates DL and the SFI indicates UL; the semi-static assignment indicates UL and the SFI indicates DL; the SFI indicates UL and the DCI indicates DL; the SFI indicates DL and the DCI indicates UL FIG. 43—Utilizing a Flexible Slot Indicator FIG. 43 is a flowchart diagram illustrating apparatuses, systems, and methods for utilizing a flexible slot indicator in wireless communication. Aspects of the method of FIG. 43 may be implemented by a wireless device, a base station, and/or a network, such as the UE 106, the BS 102, and/or the network 100 illustrated in and described with respect to various of the Figures herein, or more generally in conjunction with any of the computer systems or devices shown in the above Figures, among other devices, as desired. In various embodiments, some of the elements of the methods shown may be performed concurrently, in a different order than shown, may be substituted for by other method elements, or may be omitted. Additional method elements may also be performed as desired. As shown, the method of FIG. 43 may operate as follows.

In 4302, a base station (BS) may establish communication with a first user equipment device (UE). The BS and the UE may each include wireless communication circuitry for performing wireless communication with each other and/or other devices. Additionally, the BS and the UE may each include one or more processing elements, e.g., that may execute program instructions to operate the respective device.

In 4304, the BS may determine a transmission direction for each of a plurality of symbols included in one or more slots. The BS may determine this transmission direction for the plurality of symbols in a dynamic fashion or a semi-static fashion, as desired. Additionally, the determination may be performed for a single UE, for a plurality of UEs, and/or all UEs in communication with the BS.

Based on the determination in 4304, in 4306, the BS may transmit information indicating the transmission direction for each of the plurality of symbols included in one or more slots (e.g., consecutive slots). In some embodiments, this information may be a slot format indicator (SFI), which is used for describing the information in the remainder of the flowchart for convenience, but the information is not limited to only an SFI. The SFI may specify the transmission direction for 14 symbols of a first slot, e.g., as "uplink", "downlink", and/or "unknown" (although "sidelink", "flexible", "special", or "blank" are also contemplated).

In some embodiments, the BS may transmit the SFI within a group common PDCCH that may be decodable by one or more UEs (e.g., designated by RRC signaling). The UEs that are not served may be able to use the SFI to determine when decoding is not necessary (e.g., thereby avoiding blind decodings) and reduce power consumption.

Note that the SFI may overwrite a previous indication or default transmission direction for the plurality of symbols. For example, a symbol previously indicated as uplink may be overwritten to be downlink via the SFI. In some embodiments, only flexible, special, or unknown symbols may be allowed to be overwritten, although in other embodiments this limited overwriting may not be true. Thus, according to some embodiments, the SFI may provide a dynamic override capability for previously indicated transmission direction configurations.

In some embodiments, the BS may transmit an SFI table to the UE specifying a plurality of sets of transmission directions, where each set of transmission directions specifies the transmission direction of at least one slot. Accordingly, the SFI may refer to a table entry of the table that specifies or otherwise indicates one of the sets of transmission directions. In some embodiments, a single set of transmission directions (e.g., for a single slot) may be indicated by single slot format. The single slot format may be indicated by an index value of a table of known single slot formats (e.g., specified by a wireless standard such as LTE or NR). Thus, the SFI table may include a plurality of entries, each entry specifying one or more single slot formats, depending on the number of slots indicated by the entry in the SFI table. Note that the SFI table may have been previously transmitted by the BS (e.g., prior to transmitting the SFI), by a different BS or other entity of the wireless network, and/or may have simply been stored by the UE at a different time.

In some embodiments, the BS may be configured to determine the transmission direction for symbols of a plurality of slots and the SFI may indicate the transmission direction for the symbols for more than one slot at a time. For example, the SFI may indicate the transmission directions for a first slot, a second slot, or n slots. These transmission directions may be the same or different for each of the slots. For example, the transmission directions may be the same for the first slot and the second slot indicated by a single SFI. Alternatively, the transmission directions may be different between the first slot and the second slot, even though both are indicated by the single SFI. In some embodiments, the single SFI may refer to an entry of the SFI table discussed above, and the table entry may indicate a plurality of single slot formats (e.g., corresponding to each respective slot specified by the table entry) for the plurality of slots. Thus, the SFI may correspond to an index value or table entry of the SFI table that specifies multiple single slot formats for multiple slots (e.g., consecutive slots).

Note that the number of slots indicated by each entry in the table may vary (e.g., a first index value may indicate a single slot format for a single slot, but a second index value may indicate multiple single slot formats for a plurality of slots). For example, in one embodiment, an index of the SFI table may be transmitted through the SFI field of GC-PDCCH, e.g., every period. The SFI table may be flexible such that it could include different length of slot formats in different entries. For example, SFI index 1 may indicate slot formats for the upcoming two slots while SFI index 2 may indicate formats for the upcoming 4 slots.

In one embodiment, the SFI may have a generalized format indicating the number of DL slots, the number of DL symbols, the number of gaps, the number of UL symbols, and/or the number of UL slots together for a given period. With these five (or possibly four with total period signaled) information signaled to UE, the UE may determine the slot formats (e.g., the transmission directions of all the OFDM symbols) for the upcoming period. In some embodiments, this generalized format may be used for indicating the semi-static UL/DL transmission. For example, in one embodiment, the SFI may include size parameters defining a partitioning of the plurality of slots into a downlink transmission region, a gap region and an uplink region, wherein boundaries between said regions are specified at a granularity of symbols. It should be noted that this generalized format may be provided at other times (e.g., during semi-static configuration) and may be referred to as something other than SFI (e.g., the SFI may be used at a later period to modify the semi-static configuration).

In 4306, the BS and the UE may perform communication during the one or more slots according to the determined transmission direction indicated by the SFI.

In some embodiments, when a UE detects a conflict between a previous configuration (e.g., specified in CORESET, DCI values, or any previous configuration of transmission direction) and the SFI for a symbol, it may determine a behavior on symbol by symbol basis, depending on the particular conflict. For example, when there is a conflict in a transmission direction (e.g., either the SFI or a previous configuration specifies UE transmission during the symbol, but the other does not), the UE may be configured to not transmit (e.g., perform some other action or generally avoid transmission) during the symbol. Embodiments of behaviors for conflicts are described above under the heading "Using SFI Values".

Note that the determination and/or transmission of the SFI may be performed a plurality of times, e.g., in a periodic manner. For example, the SFI may be transmitted periodically every n slots, where n could be any desired value (e.g., 1, 2, 3, 5, 10, etc.). Additionally, or alternatively, the SFI may be determined or updated in a dynamic fashion, based on different events or situations. For example, the SFI may be in effect until it is updated by a new SFI, e.g., transmitted by the BS. In some embodiments, the SFI may be transmitted one or more symbols (e.g., a plurality of symbols) before the one or more slots indicated by the SFI. For example, the SFI may be transmitted for a future slot in order to ensure the UE can be prepared for the transmission directions indicated by the SFI for the slot(s) indicated by the SFI.

Exemplary Embodiments

In the following further exemplary embodiments are provided.

One set of embodiments may include a method for operating a UE device, the method comprising: receiving, by a radio of the UE device, information identifying a base TDD configuration, wherein the base TDD configuration indicates base transmission directions associated with respective slots in a radio frame; receiving, by a radio of the UE device, a slot format indicator (SFI) from a group common PDCCH in a PDCCH region of a given slot of the radio frame, wherein the SFI indicates that the base transmission direction associated with the given slot is dynamically overridden to a new transmission direction opposite to the base transmission direction; in response to receiving said SFI, performing uplink data transmission or downlink data reception in the given slot according to the new transmission direction.

In some embodiments, the base transmission direction for the given slot is uplink.

In some embodiments, the base transmission direction for the given slot is downlink.

One set of embodiments may include a method for operating a base station, the method comprising: transmitting, by a radio of the base station, information identifying a base TDD configuration, wherein the base TDD configuration indicates base transmission directions associated with respective slots in a radio frame; transmitting, by a radio of the base station, a slot format indicator (SFI) in a group common PDCCH in a PDCCH region of a given slot of the radio frame, wherein the SFI indicates that the base transmission direction associated with the given slot is dynamically overridden to a new transmission direction opposite to the base transmission direction; performing uplink data reception or downlink data transmission in the given slot based on the new transmission direction.

Another set of embodiments may include a method for operating a UE device, the method comprising: receiving, by a radio of the UE device, a slot format indicator (SFI) from a group common PDCCH in a PDCCH region of a given slot of a radio frame, wherein, for each symbol in the given slot, the SFI determines a transmission direction for that symbol, wherein the PDCCH region spans the first N symbol durations of the given slot.

Another set of embodiments may include a method for operating a base station, the method comprising: transmitting, by a radio of the base station, a slot format indicator (SFI) in a group common PDCCH of a PDCCH region of a given slot of a radio frame, wherein, for each symbol in the given slot, the SFI determines a transmission direction for that symbol, wherein the PDCCH region spans the first N symbol durations of the given slot.

Another set of embodiments may include a method for operating a UE device, the method comprising: receiving, by a radio of the UE device, a slot format indicator (SFI) from a group common PDCCH of a PDCCH region of a given slot of a radio frame, wherein the SFI indicates that the given slot is a first slot in an aggregated set of one or more slots in the radio frame, wherein the one or more slots are consecutive in time, wherein the SFI indicates the number of said one or more slots, wherein the SFI also indicates whether the aggregated set of one or more slots is reserved for future use or to be used for a side link transmission between said UE device and another UE device.

Another set of embodiments may include a method for operating a base station, the method comprising: transmitting, by a radio of the base station, a slot format indicator (SFI) in a group common PDCCH of a PDCCH region of a given slot of a radio frame, wherein the SFI indicates that the given slot is a first slot in an aggregated set of one or more slots in the radio frame, wherein the one or more slots are consecutive in time, wherein the SFI indicates the number of said one or more slots, wherein the SFI also indicates whether the aggregated set of one or more slots is reserved for future use or to be used for a side link transmission between UE devices.

Another set of embodiments may include a method for operating a UE device, the method comprising: receiving, by a radio of the UE device, a slot format indicator (SFI) from a group common PDCCH of a PDCCH region of a given slot of a radio frame, wherein the SFI indicates that the given slot is a first slot in an aggregated set of one or more slots in the radio frame, wherein the one or more slots are consecutive in time, wherein the SFI indicates the number of said one or more slots, wherein, for each symbol in the aggregated set of one or more slots, the SFI determines a transmission direction for the symbol.

Another set of embodiments may include a method for operating a base station, the method comprising: transmitting, by a radio of the base station, a slot format indicator (SFI) in a group common PDCCH of a PDCCH region of a given slot of a radio frame, wherein the SFI indicates that the given slot is a first slot in an aggregated set of one or more slots in the radio frame, wherein the one or more slots are consecutive in time, wherein the SFI indicates the number of said one or more slots, wherein, for each symbol in the aggregated set of one or more slots, the SFI determines a transmission direction for the symbol.

Another set of embodiments may include a method for operating a UE device, the method comprising: receiving, by a radio of the UE device, a slot format indicator (SFI) from a group common PDCCH of a PDCCH region of a given slot of a radio frame, wherein the SFI indicates that the given slot is a first slot in a set of one or more slots in the radio frame, wherein the one or more slots are consecutive in time, wherein the SFI includes size parameters defining a partitioning of the set of one or more slots into a downlink transmission region, a gap region and an uplink region, wherein boundaries between said regions are specified at a granularity of symbols.

Another set of embodiments may include a method for operating a base station, the method comprising: transmitting, by a radio of the base station, a slot format indicator (SFI) in a group common PDCCH of a PDCCH region of a given slot of a radio frame, wherein the SFI indicates that the given slot is a first slot in a set of one or more slots in the radio frame, wherein the one or more slots are consecutive in time, wherein the SFI includes size parameters defining a partitioning of the set of one or more slots into a downlink transmission region, a gap region and an uplink region, wherein boundaries between said regions are specified at a granularity of symbols.

In some embodiments, the uplink region occurs after the gap region, wherein the gap region occurs after the downlink region, wherein the downlink region occurs after the PDCCH region.

Another set of embodiments may include a method for operating a UE device, the method comprising: receiving, by a radio of the UE device, slots in a radio frame, wherein each of the slots includes a corresponding PDCCH region, wherein, for each of the slots, the corresponding PDCCH region includes a corresponding group common PDCCH and a corresponding set of one or more PDCCHs, wherein, for each of the slots, the corresponding group common PDCCH includes a corresponding slot format indicator (SFI) that indicates a transmission direction for the slot, wherein, for a given one of the slots, the corresponding SFI indicates that the given slot is an initial slot in an aggregated set of two or more of the slots, wherein the two or more slots are consecutive in time, wherein, for each of the two or more slots, the corresponding set of one or more PDCCHs includes corresponding scheduling information that allocates corresponding transmission resources in the slot.

Another set of embodiments may include a method for operating a base station, the method comprising: transmitting, by a radio of the base station, slots in a radio frame, wherein each of the slots includes a corresponding PDCCH region, wherein, for each of the slots, the corresponding PDCCH region includes a corresponding group common PDCCH and a corresponding set of one or more PDCCHs, wherein, for each of the slots, the corresponding group common PDCCH includes a corresponding slot format indicator (SFI) that indicates a transmission direction for the slot, wherein, for a given one of the slots, the corresponding SFI indicates that the given slot is an initial slot in an aggregated set of two or more of the slots, wherein the two or more slots are consecutive in time, wherein, for each of the two or more slots, the corresponding set of one or more PDCCHs includes corresponding scheduling information that allocates corresponding transmission resources in the slot.

Another set of embodiments may include a method for operating a UE device, the method comprising: receiving, by a radio of the UE device, a plurality of slots in a radio frame, wherein the slots are consecutive in time, wherein only a first of the slots includes a PDCCH region, wherein the PDCCH region of the first slot includes a group common PDCCH and a set of one or more PDCCHs, wherein the group common PDCCH includes a slot format indicator (SFI) that indicates a transmission direction for the plurality of slots and indicates that the plurality of slots form an aggregated set, wherein the set of one or more PDCCHs includes scheduling information that allocates transmission resources for all the slots.

Another set of embodiments may include a method for operating a base station, the method comprising: transmitting, by a radio of the UE device, a plurality of slots in a radio frame, wherein the slots are consecutive in time, wherein only a first of the slots includes a PDCCH region, wherein the PDCCH region of the first slot includes a group common PDCCH and a set of one or more PDCCHs, wherein the group common PDCCH includes a slot format indicator (SFI) that indicates a transmission direction for the plurality of slots and indicates that the plurality of slots form an aggregated set, wherein the set of one or more PDCCHs includes scheduling information that allocates transmission resources for all the slots.

Another set of embodiments may include a method for operating a UE device, the method comprising: receiving, by a radio of the UE device, a first slot format indicator (SFI) from a first slot of a radio frame, wherein the first SFI occurs in a group common PDCCH in a PDCCH region of the first slot; determining that the first slot format indicator (SFI) indicates the presence of PDCCH information in the PDCCH region of the first slot, and that the first SFI indicates the first slot is an initial slot in an aggregated plurality of slots of the radio frame; decoding the PDCCH information in the PDCCH region of the first slot to determine that the UE device is not scheduled in the aggregated plurality of slots; determining that a second SFI in a PDCCH region of a non-initial slot of the aggregated plurality indicates that the non-initial slot does not include PDCCH information; saving power by not attempting to decode PDCCH information from the PDCCH region of the non-initial slot.

Another set of embodiments may include a method for operating a UE device, the method comprising: receiving, by a radio of the UE device, a first slot format indicator (SFI) from a first slot of a radio frame, wherein the first SFI occurs in a group common PDCCH in a PDCCH region of the first slot; determining that the first slot format indicator (SFI) indicates the presence of PDCCH information in the PDCCH region of the first slot, and that the first SFI indicates the first slot is an initial slot in an aggregated plurality of slots of the radio frame; decoding the PDCCH information in the PDCCH region of the first slot to determine that the UE device is scheduled in the aggregated plurality of slots; determining that a second SFI in a PDCCH region of the second slot of the aggregated plurality indicates that the second slot does not include PDCCH information; decoding at least a portion of downlink data from the PDCCH region of the second slot.

In some embodiments, each slot is 2 or 7 or 14 symbols in length.

Another set of embodiments may include a method for operating a base station, the method comprising: transmitting, by a radio of the base station, a first slot format indicator (SFI) within a first slot of a radio frame, wherein the first SFI indicates a first transmission direction for at least a first portion of the first slot, wherein the first transmit direction is either uplink transmission or downlink transmission; wherein the SFI is included in a group common PDCCH of a PDCCH region of the first slot, wherein the PDCCH region spans the first N symbol durations of the first slot, wherein N is greater than or equal to one.

In some embodiments, N is equal to one.

In some embodiments, the first SFI indicates that the PDCCH region includes at least one PDCCH.

In some embodiments, the first SFI indicates that the PDCCH region does not include a PDCCH.

In some embodiments, the first SFI also indicates a second transmit direction for a second portion of the first slot, wherein the second transmit direction is a direction opposite to the first transmit direction.

In some embodiments, the first SFI also indicates a second transmit direction for at least a portion of a second slot, wherein the second slot follows immediately after the first slot, wherein the second transmit direction is a direction opposite to the first transmit direction.

In some embodiments, the first transmit direction is uplink transmission, wherein the first SFI indicates a slot aggregation level for uplink transmission.

In some embodiments, the first transmit direction is downlink transmission, wherein an extent of slot aggregation for the downlink transmission is indicated in a DCI of a radio frame containing the first slot.

In some embodiments, the method further includes transmitting, by the radio, a second SFI in a second slot of the radio frame, wherein the second slot follows immediately after the first slot, wherein the second SFI indicates a second transmit direction for at least a portion of the second slot, wherein the second transmit direction is either uplink transmission or downlink transmission, wherein the second SFI is included in a group common PDCCH of a PDCCH region of the second slot.

In some embodiments, the second SFI indicates that the PDCCH region of the second slot does not include a PDCCH.

In some embodiments, the method further includes transmitting, by the radio, a second SFI in a second slot of the radio frame, wherein the second SFI indicates that at least a portion of the second slot is blank, wherein the second SFI is included in a group common PDCCH of a PDCCH region of the second slot.

In some embodiments, the method further includes transmitting, by the radio, a second SFI in a second slot of the radio frame, wherein the second SFI indicates that at least a portion of the second slot is to be used for a side link, wherein the second SFI is included in a group common PDCCH of a PDCCH region of the second slot.

In some embodiments, the slot is two or 7 or 14 symbols in length.

Another set of embodiments may include a method for operating a user equipment (UE) device, the method comprising: receiving, by a radio of the UE device, a first slot format indicator (SFI) from a first slot of a radio frame, wherein the first SFI indicates a first transmission direction for at least a first portion of the first slot, wherein the first transmit direction is either uplink transmission or downlink transmission; wherein the SFI is included in a group common PDCCH of a PDCCH region of the first slot, wherein the PDCCH region spans the first N symbol durations of the first slot, wherein N is greater than or equal to one.

In some embodiments, the method further includes performing uplink transmission or downlink reception in the first portion of the first slot based on the first transmission direction.

In some embodiments, N is equal to one.

In some embodiments, the method further includes in response to determining that the SFI indicates the PDCCH region of the first slot includes at least one PDCCH, decoding the PDCCH from the PDCCH region.

In some embodiments, the method further includes in response to determining that the first SFI indicates the PDCCH region does not include a PDCCH, omitting an attempt to decode PDCCH information from the PDCCH region.

In some embodiments, in response to determining that the first SFI indicates a second transmit direction for a second portion of the first slot, performing downlink reception or uplink transmission in the second portion of the first slot based on second transmit direction, wherein the second transmit direction is a direction opposite to the first transmit direction.

In some embodiments, the first SFI also indicates a second transmit direction for at least a portion of a second slot, wherein the second slot follows immediately after the first slot, wherein the second transmit direction is a direction opposite to the first transmit direction.

In some embodiments, the first transmit direction is uplink transmission, wherein the first SFI indicates a slot aggregation level for uplink transmission.

In some embodiments, the first transmit direction is downlink transmission, wherein an extent of slot aggregation for the downlink transmission is indicated in a DCI of a radio frame containing the first slot.

In some embodiments, the method further includes receiving, by the radio of the UE device, a second SFI in a second slot of the radio frame, wherein the second slot follows immediately after the first slot, wherein the second SFI indicates a second transmit direction for at least a portion of the second slot, wherein the second transmit direction is either uplink transmission or downlink transmission, wherein the second SFI is included in a group common PDCCH of a PDCCH region of the second slot.

In some embodiments, the method further includes in response to determining that the second SFI indicates the PDCCH region of the second slot does not include a PDCCH, saving power by making no attempt to decode PDCCH information from the PDCCH region of the second slot.

In some embodiments, the method further includes receiving, by the radio of the UE device, a second SFI in a second slot of the radio frame; and in response to determining that the second SFI indicates that at least a portion of the second slot is blank, disabling uplink transmission or downlink reception in said at least a portion of the second slot, wherein the second SFI is included in a group common PDCCH of a PDCCH region of the second slot In some embodiments, the method further includes receiving, by the radio, a second SFI in a second slot of the radio frame, performing a side link transmission in at least a portion of the second slot in response to determining that the second SFI indicates said at least a portion is to be used for a side link, wherein the second SFI is included in a group common PDCCH of a PDCCH region of the second slot.

In some embodiments, the slot is two or 7 or 14 symbols in length.

Another set of embodiments may include a method for operating a base station, the method comprising: transmitting, by a radio of the base station, a first slot format indicator (SFI) within a given slot of a radio frame, wherein the first SFI indicates that at least a first portion of the given slot is to be used for uplink transmission, wherein the first SFI is included in a group common PDCCH of the given slot, wherein the group common PDCCH occurs within the first N symbol durations of the given slot, wherein N is an integer greater than or equal to one.

In some embodiments, the given slot includes a gap region, wherein said first portion follows immediately after said gap region, wherein said gap region follows immediately after said first N symbol durations.

In some embodiments, the first SFI also indicates that one or more slots following immediately after the given slot are to be used only for uplink transmission, wherein the first SFI also indicates the number of said one or more slots.

In some embodiments, the first SFI also indicates that: at least a second slot follows immediately after the given slot; and the second slot is to be used only for uplink transmission, wherein no temporal gap occurs between a temporal end of the first portion and a temporal beginning of the second slot.

In some embodiments, the given slot has been previously designated as a downlink slot by downlink control information (DCI) of the radio frame, wherein said first SFI overrides said previous designation.

In some embodiments, the first SFI also indicates that the given slot includes a set of one or more PDCCHs, wherein the set of one or more PDCCHs occurs with the first N symbol durations of the given slot, wherein the set of one or more PDCCHs include scheduling information allocating to at least one UE device time-frequency resources in the first portion.

Another set of embodiments may include a method for operating a base station, the method comprising: transmitting, by a radio of the base station, a first slot format indicator (SFI) within a given slot of a radio frame, wherein the first SFI indicates that at least a first portion of the given slot is used for downlink transmission, wherein the first SFI is included in a group common PDCCH of the given slot, wherein the group common PDCCH occurs within the first N symbol durations of the given slot, wherein N is an integer greater than or equal to one.

In some embodiments, the first portion starts immediately after the first N symbol durations of the given slot.

In some embodiments, the first portion includes resource elements that occur after the first N symbol durations of the given slot and other resource elements within the first N symbol durations.

In some embodiments, the given slot also includes a gap region and a second portion, wherein the second portion is to be used only for uplink transmission, wherein the second portion starts immediately after the gap region, wherein the gap region starts immediately after the first portion.

In some embodiments, the second portion temporally spans one or two symbol durations.

In some embodiments, the second portion contains a positive or negative acknowledgement (ACK/NACK) for at least a portion of said downlink transmission.

In some embodiments, the first SFI also indicates that a set of one or more PDCCHs are included within the first N symbol durations.

In some embodiments, the set of one or more PDCCHs includes scheduling information that allocates time-frequency resources in the first portion for downlink transmission to one or more UEs.

In some embodiments, the first portion covers at least the given slot minus the first N symbol durations.

In some embodiments, the given slot has been previously designated as an uplink slot by downlink control information (DCI) of the radio frame, wherein said first SFI overrides said previous designation.

Another set of embodiments may include a method for operating a base station, the method comprising: transmitting, by a radio of the base station, a plurality of slots that are consecutive in time, wherein each of the slots includes a corresponding group common PDCCH within the first N symbol durations of the slot, wherein N is greater than or equal to one, wherein, for each slot, the corresponding group common PDCCH includes a corresponding slot format indicator (SFI), wherein, for each slot, the corresponding SFI indicates that: the slot includes a corresponding set of one or more PDCCHs; and the slot includes a corresponding downlink data portion; wherein the set of one or more PDCCHs in an initial one of the slots includes first scheduling information that allocates a first set of time-frequency resources aggregated over at least the downlink data portion of the initial slot and the downlink data portion of a second of the slots; wherein the set of one or more PDCCHs in the second slot includes second scheduling information that allocates only time-frequency resources in the downlink data portion of the second slot.

In some embodiments, for each of the slots, the corresponding downlink data portion starts immediately after the first N symbol durations of the slot In some embodiments, all of the slots except for a last of the slots are dedicated for downlink transmission only, wherein the last slot includes an uplink transmission portion only at its temporal end.

In some embodiments, an aggregation level for said first set of time-frequency resources is indicated by a downlink control channel of the radio frame.

In some embodiments, an aggregation level for said first set of time-frequency resources is indicated by a aggregation level field in the group common PDCCH.

In some embodiments, for each of the slots except for a last of the slots, the corresponding downlink data portion covers at least the slot minus the first N symbol durations.

In some embodiments, for each of the slots except for a last of the slots, the corresponding downlink data portion temporally spans the slot minus the first N symbol durations.

In some embodiments, a last of the slots also includes a gap region and an uplink data portion, wherein, in the last slot, the uplink data portions starts immediately after the gap region, and the gap region starts immediately after the downlink data portion.

In some embodiments, the uplink data portion includes at least acknowledgements for downlink transmissions.

Another set of embodiments may include a method for operating a base station, the method comprising: transmitting, by a radio of the base station, a plurality of slots that are consecutive in time, wherein each of the slots includes a corresponding group common PDCCH within the first N symbol durations of the slot, wherein N is greater than or equal to one, wherein, for each slot, the corresponding group common PDCCH includes a corresponding slot format indicator (SFI), wherein, for each slot, the corresponding SFI indicates that the slot includes a corresponding downlink data portion, wherein, for an initial one of the slots, the corresponding SFI indicates that the initial slot includes a corresponding set of one or more PDCCHs, wherein the corresponding set of one or more PDCCHs in the initial slot includes first scheduling information that allocates an aggregation of time-frequency resources over all the downlink data portions of all the slots, wherein, for each of the slots after the initial slot, the corresponding SFI indicates that the slot does not include a PDCCH.

In some embodiments, all of the slots except for a last of the slots are dedicated for downlink transmission only, wherein the last slot includes an uplink transmission portion only at its temporal end.

In some embodiments, for a second of the slots, the corresponding downlink data portion covers at least a region equal to the second slot minus N OFDM symbols corresponding to the first N symbol durations of the second slot.

In some embodiments, for each of the slots, the corresponding downlink data portion starts immediately after the first N symbol durations of the slot.

In some embodiments, for each of the slots except for a last of the slots, the corresponding downlink data portion temporally spans the slot minus the first N symbol durations.

In some embodiments, in a last of the slots, the corresponding downlink data portion is followed immediately by a gap region, which is followed immediately by an uplink data portion, wherein the uplink data portion includes at least acknowledgements for downlink transmissions.

In some embodiments, an aggregation level for said aggregation of time-frequency resources is indicated by a downlink control channel of the radio frame.

In some embodiments, an aggregation level for said aggregation of time-frequency resources is indicated by an aggregation level field which is separately encoded from SFI which encodes transmission direction only.

Another set of embodiments may include a method for operating a base station, the method comprising: transmitting, by a radio of the base station, a plurality of slots that are consecutive in time, wherein only a temporally initial one of the slots includes a PDCCH region that temporally spans the first N symbol durations of the initial slot, wherein N is greater than or equal to one, wherein the PDCCH region includes a group common PDCCH, wherein the group common PDCCH of the initial slot includes a slot format indicator (SFI), wherein the SFI indicates: that each of the slots includes a corresponding downlink data portion; and the number of slots in said plurality of slots; wherein only a last of the slots includes an uplink data portion, wherein the uplink data portion occurs at a temporal end of the last slot, wherein the downlink data portion of the last slot starts at the temporal beginning of the last slot.

In some embodiments, in the initial slot, the corresponding downlink data portion starts immediately after the PDCCH region, and spans the initial slot minus the PDCCH region.

In some embodiments, for each of the slots after the initial slot, the slot does not include any information that schedules time-frequency resources in the corresponding downlink data portion to user equipment.

In some embodiments, the SFI in the initial slot indicates that the PDCCH region of the initial slot includes a set of one or more PDCCHs, wherein the set of one or more PDCCHs includes scheduling information that allocates an aggregated set of time frequency resources, wherein the aggregated set include resource portions from the downlink data portions of all the slots.

In some embodiments, the SFI indicates a number of symbols durations occupied by the uplink data portion in the last slot.

In some embodiments, in the last slot, a gap region occurs between the downlink data portion and the uplink data portion.

In some embodiments, there are at least three slots in said plurality of slots, wherein, in each of the slots of said plurality except for the initial slot and the last slot, the corresponding downlink data portion entirely covers the slot.

In some embodiments, the SFI could be divided into transmission direction and slot aggregation, and encoded separately.

Another set of embodiments may include a method for operating a base station, the method comprising: transmitting, by a radio of the base station, a slot format indicator (SFI) within a group common PDCCH region of a first slot, wherein the group common PDCCH region occurs within the first N symbol durations of the first slot, wherein N is greater than or equal to one, wherein the SFI indicates that a UE device is not to transmit or receive over a region of the first slot equal to the first slot minus the group common PDCCH region.

In some embodiments, the SFI indicates the UE device is not to transmit or receive during one or more consecutive slots starting immediately after the first slot, wherein the SFI also indicates the number of said one or more slots.

In some embodiments, a group common PDCCH in PDCCH region is decodable by each UE in a designed group of UEs, wherein the SFI indicates that a side link transmission between UEs is enabled during said first slot.

Another set of embodiments may include a method for operating a first user equipment (UE) device, the method comprising: receiving, by a radio of the first UE device, a slot format indicator (SFI) from a group common PDCCH region of a first slot, wherein the group common PDCCH region occurs within the first N symbol durations of the first slot, wherein N is greater than or equal to one, wherein the SFI indicates that a region of the first slot equal to the first slot minus the group common PDCCH region is not used by the base station for downlink transmission and is not to be used by the first UE device for uplink transmission to the base station.

In some embodiments, the SFI indicates that one or more slots following immediately after the first slot are not used by the base station for downlink transmission and are not to be used by the first UE device for uplink transmission to the base station, wherein the SFI also indicates the number of said one or more slots.

In some embodiments, the SFI indicates that a side link transmission between the first UE device and another UE device is enabled during the first slot.

Another set of embodiments may include a method for operating a base station, the method comprising: transmitting, by a radio of the base station, a first slot and a second slot, wherein the second slot is transmitted immediately after the first slot, wherein the first slot includes a group common PDCCH, wherein the group common PDCCH occurs within the first N symbol durations of the first slot, wherein N is greater than or equal to one, wherein the group common PDCCH indicates that: the first slot includes a downlink data portion; and the second slot is used entirely for uplink transmission.

In some embodiments, the downlink data portion of the first slot starts immediately after the first N symbol durations of the first slot.

In some embodiments, the first slot also includes a gap region at its temporal end.

In some embodiments, the SFI also indicates that the first slot does not include a PDCCH.

In some embodiments, the SFI also indicates that the first slot does not include scheduling information that allocates time-frequency resources to a UE device.

In some embodiments, the SFI also indicates that the first slot includes a set of one or more PDCCHs, wherein the set of one or more PDCCHs includes scheduling information that allocates downlink transmission resources in the downlink data portion and uplink transmission resources in the second slot.

Another set of embodiments may include a method for operating a base station, the method comprising: transmitting, by a radio of the base station, a slot format indicator in a first slot of a plurality of slots, wherein the slots of said plurality are consecutive in time, wherein the slot format indicator occurs within a group common PDCCH of the first slot, wherein the group common PDCCH occurs within the first N symbol durations of the first slot, wherein N is greater than or equal to one, wherein the slot format indicator includes size parameters for a partitioning of the union of the slots minus at least the first N symbols durations of the first slot into a downlink data region, a gap region and an uplink data region, wherein the downlink data region starts after the first N symbol durations of the first slot, wherein the gap region starts immediately after the downlink data region, wherein the uplink data region starts immediately after the gap region, wherein the size parameters include: a first number M of slots defining a size of an initial portion of the downlink data region; a second number of symbol durations defining a size of a terminal portion of the downlink data region, wherein the terminal portion occurs in the $(M+1)^{th}$ slot of said plurality; a third number of symbol durations defining a size of the gap region within the $(M+1)^{th}$ slot of said plurality; a fourth number of symbol durations defining a size of an initial portion of the uplink data region within the $(M+1)^{th}$ slot of said plurality; and a fifth number of slots defining a size of a terminal portion of the uplink data region.

Another set of embodiments may include a method for operating a base station, the method comprising: transmitting, by a radio of the base station, a slot format indicator in a first slot of a plurality of slots, wherein the slots of said plurality are consecutive in time, wherein the slot format indicator occurs within a group common PDCCH of the first slot, wherein the group common PDCCH occurs within the first N symbol durations of the first slot, wherein N is greater than or equal to one, wherein the slot format indicator includes size parameters for a partitioning of the union of the slots minus at least the first N symbols durations of the first slot into a downlink data region, a gap region and an uplink data region, wherein the downlink data region starts after the first N symbol durations of the first slot, wherein the gap region starts immediately after the downlink data region, wherein the uplink data region starts immediately after the gap region, wherein the size parameters include a first number M of slots defining a size of an initial portion of the downlink data region, wherein the size parameters include two of the following three parameters: a second number of symbol durations defining a size of a terminal portion of the downlink data region, wherein the terminal portion occurs in the $(M+1)^{th}$ slot of said plurality; a third number of symbol durations defining a size of the gap region within the $(M+1)^{th}$ slot of said plurality; a fourth number of symbol durations defining a size of an initial portion of the uplink data region within the $(M+1)^{th}$ slot of said plurality; wherein the size parameters also include a fifth number of slots defining a size of a terminal portion of the uplink data region.

Another set of embodiments may include a method for operating a base station, the method comprising: transmitting, by a radio of the base station, a plurality of slots that are consecutive in time, wherein each of the slots includes a corresponding group common PDCCH within the first N symbol durations of the slot, wherein N is greater than or equal to one, wherein, for each slot, the corresponding group common PDCCH includes a corresponding slot format indicator (SFI), wherein, for each slot, the corresponding SFI indicates that: the slot includes a corresponding set of one or more PDCCHs; and the slot includes a corresponding downlink data portion; wherein the set of one or more PDCCHs in an initial one of the slots includes first scheduling information that allocates to a first UE device a first set of time-frequency resources that are aggregated over two or more of the downlink data portions including the downlink data portion of the initial slot; wherein the set of one or more PDCCHs in the initial slot includes second scheduling information that allocates to a second UE device time-frequency resources only in the downlink data portion of the initial slot.

In some embodiments, the set of one or more PDCCHs in a second one of the slots includes third scheduling information that allocates to a third UE device time-frequency resources only in the downlink data portion of the second slot.

In some embodiments, acknowledgements from one or more UEs scheduled in the two or more downlink data portions are included in a last portion of a last of the slots.

Another set of embodiments may include a method for operating a base station, the method comprising: transmitting, by a radio of the base station, a plurality of slots that are consecutive in time, wherein each of the slots includes a corresponding group common PDCCH within the first N symbol durations of the slot, wherein N is greater than or equal to one, wherein, for each slot, the corresponding group common PDCCH includes a corresponding slot format indicator (SFI), wherein, for each slot, the corresponding SFI indicates that: the slot includes a corresponding set of one or more PDCCHs; and the slot includes a corresponding downlink data portion; wherein the set of one or more PDCCHs in an initial one of the slots includes first scheduling information that allocates to a first UE device a first portion of an aggregated set of time frequency resources, wherein the first portion occurs within the downlink data portion of the initial slot, wherein the set of one or more PDCCHs in a second of the slots includes second scheduling information that allocates to the first UE device a second portion of the aggregated set of time frequency resources, wherein the second portion occurs within the downlink data portion of the second slot, wherein the second slot follows immediately after the initial slot, wherein the set of one or more PDCCHs in the initial slot also includes third scheduling information that allocates to a second UE device time frequency resources only in the downlink data portion of the initial slot.

In some embodiments, the set of one or more PDCCHs in the second slot includes fourth scheduling information that allocates to a third UE device time frequency resources only in the downlink data portion of the second slot.

Another set of embodiments may include a method for operating a base station, the method comprising: transmitting, by a radio of the base station, a plurality of slots that are consecutive in time, wherein each of the slots includes a corresponding PDCCH region spanning the first N symbol durations of the slot, wherein N is greater than or equal to one, wherein, for each of the slots, the corresponding PDCCH region includes a corresponding group common PDCCH; wherein, for each slot, the corresponding group common PDCCH includes a corresponding slot format indicator (SFI), wherein, for each slot, the corresponding SFI indicates that the slot includes a corresponding downlink data portion; wherein, for an initial one of the slots, the corresponding SFI indicates that the corresponding PDCCH region includes a first set of one or more PDCCHs; wherein, for a second one of the slots, the corresponding SFI indicates that a subregion equal to the corresponding PDCCH region minus the corresponding group common PDCCH does not include PDCCH information, wherein the downlink data portion for the second slot includes a first subset of resource elements residing within the subregion of the PDCCH region of the second slot and a second subset of resource elements occurring after the PDCCH region of the second slot.

In some embodiments, the downlink data portion of the initial slot starts after the PDCCH region of the initial slot.

In some embodiments, each slot spans two or 7 or 14 symbols in time.

Another set of embodiments may include a base station, comprising: an antenna; a radio operably coupled to the antenna; and a processing element operably coupled to the radio; wherein the antenna, radio, and processing element are configured to implement a method according to any of the preceding paragraphs.

Another set of embodiments may include an apparatus, comprising a processing element configured to implement a method according to any of the preceding paragraphs.

Another set of embodiments may include a computer program comprising instructions for performing any of the methods of any of the preceding paragraphs.

Another set of embodiments may include a apparatus comprising means for performing any of the method elements of any of the preceding paragraphs.

Another set of embodiments may include a method that includes any action or combination of actions as substantially described herein in the Detailed Description.

Another set of embodiments may include a method as substantially described herein with reference to each or any combination of the Figures included herein or with reference to each or any combination of paragraphs in the Detailed Description.

Another set of embodiments may include a wireless device configured to perform any action or combination of actions as substantially described herein in the

DETAILED DESCRIPTION

Another set of embodiments may include a wireless device that includes any component or combination of components as described herein in the Detailed Description as included in a wireless device.

Another set of embodiments may include a wireless device configured to perform any action or combination of actions as substantially described herein in the

DETAILED DESCRIPTION

Another set of embodiments may include a wireless device that includes any component or combination of components as described herein in the Detailed Description as included in a wireless device.

Another set of embodiments may include a non-volatile computer-readable medium that stores instructions that, when executed, cause the performance of any action or combination of actions as substantially described herein in the Detailed Description.

Another set of embodiments may include an integrated circuit configured to perform any action or combination of actions as substantially described herein in the Detailed Description.

A still further exemplary set of embodiments may include an apparatus, comprising a processing element configured to cause a device to implement any or all parts of the preceding examples.

Another exemplary set of embodiments may include a wireless device, comprising: an antenna; a radio coupled to the antenna; and a processing element operably coupled to the radio, wherein the device is configured to implement any or all parts of the preceding examples.

A yet further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of operating a base station (BS), comprising:
by the BS:
establishing communication with a first user equipment device (UE);
determining a transmission direction for each of a plurality of symbols included in a plurality of consecutive slots;
transmitting a slot format indicator (SFI) to the UE, wherein the SFI indicates the transmission direction for each of the plurality of symbols included in the plurality of consecutive slots, wherein the SFI refers to a plurality of single slot format indicators corresponding to the plurality of consecutive slots, wherein each single slot format indicator is an entry in a table of single slot formats, wherein each single slot format indicates a respective transmission direction for each respective symbol of the 14 symbols in the corresponding slot, wherein the table of single slot formats includes each of:
at least one format that does not switch from downlink to uplink;
at least one format that switches from downlink to uplink once;
at least one format that switches between downlink and uplink twice and wherein transmission directions of respective symbols of the first half of the slot are repeated in respective symbols of the second half of the slot and
at least one format that switches between downlink and uplink twice and wherein transmission directions of respective symbols of the first half of the slot are not repeated in the respective symbols of second half of the slot and
performing communication during the plurality of consecutive slots according to the determined transmission direction.

2. The method of claim 1, wherein the SFI includes size parameters defining a partitioning of the plurality of consecutive slots into a downlink transmission region, a gap region and an uplink region, wherein boundaries between said regions are specified at a granularity of symbols.

3. The method of claim 1, wherein said transmitting the SFI is performed periodically every n slots, wherein n is at least 2.

4. The method of claim 1, wherein the SFI indicates the transmission direction for each of the plurality of symbols in a semi-static manner.

5. The method of claim 1, wherein the SFI is transmitted a plurality of symbols before the one or more slots indicated by the SFI.

6. The method of claim 1, wherein, when the first UE detects a conflict between transmission direction of a first configuration and the SFI for a first symbol and at least one of the first configuration and the SFI specify a first symbol as a transmission direction, the UE is configured to avoid transmission during the first symbol based on detecting the conflict.

7. The method of claim 1, wherein the SFI is specific to the first UE.

8. The method of claim 1, wherein the SFI applies to a plurality of UEs.

9. A method of operating a user equipment device (UE), comprising:
by the UE:
establishing communication with a base station (BS);
receiving a slot format indicator (SFI) from the BS, wherein the SFI indicates the transmission direction for each of the plurality of symbols included in a plurality of consecutive slots, wherein the SFI refers to a plurality of single slot format indicators corresponding to the plurality of consecutive slots, wherein each single slot format indicator is an entry in a table of single slot formats, wherein each single slot format indicates a respective transmission direction for each respective symbol of the 14 symbols in the corresponding slot, wherein the table of single slot formats includes each of:
at least one format that does not switch from downlink to uplink;
at least one format that switches from downlink to uplink once;
at least one format that switches between downlink and uplink twice and wherein transmission directions of respective symbols of the first half of the slot are repeated in respective symbols of the second half of the slot and
at least one format that switches between downlink and uplink twice and wherein transmission directions of respective symbols of the first half of the slot are not repeated in the respective symbols of second half of the slot; and
performing communication with the B S during the plurality of consecutive slots according to the determined transmission direction.

10. The method of claim 9, further comprising:
receiving the table of single slot formats from the BS.

11. The method of claim 9, further comprising:
detecting a conflict between transmission direction of a first configuration and the SFI for a first symbol, wherein at least one of the first configuration and the SFI specify a first symbol as a transmission direction; and
based on said detecting, performing an action other than transmission during the first symbol.

12. The method of claim 9, wherein the SFI indicates the transmission direction for each of the plurality of symbols in a semi-static manner.

13. A user equipment device (UE), comprising:
wireless communication circuitry; and
one or more processing elements operably coupled to the wireless communication circuitry, wherein the one or more processing elements are configured to operate with the wireless communication circuitry to:
establish communication with a base station (BS);
receive a slot format indicator (SFI) from the BS, wherein the SFI indicates the transmission direction for each of the plurality of symbols included in a plurality of consecutive slots, wherein the SFI refers to a plurality of single slot format indicators corresponding to the plurality of consecutive slots, wherein each single slot format indicator is an entry in a table of single slot formats, wherein each single slot format indicates a respective transmission direction for each respective symbol of the 14 symbols in the corresponding slot, wherein the table of single slot formats includes each of:
at least one format that does not switch from downlink to uplink;
at least one format that switches from downlink to uplink once;
at least one format that switches between downlink and uplink twice and wherein transmission directions of respective symbols of the first half of the slot are repeated in respective symbols of the second half of the slot and
at least one format that switches between downlink and uplink twice and wherein transmission directions of respective symbols of the first half of the slot are not repeated in the respective symbols of second half of the slot; and
perform communication with the BS during the plurality of consecutive slots according to the determined transmission direction.

14. The UE of claim 13, wherein the one or more processing elements are further configured to:
receive the table of single slot formats from the BS.

15. The UE of claim 13, wherein the SFI includes size parameters defining a partitioning of the plurality of slots into a downlink transmission region, a gap region and an uplink region, wherein boundaries between said regions are specified at a granularity of symbols.

16. The UE of claim 13, wherein the SFI indicates the transmission direction for each of the plurality of symbols in a semi-static manner.

17. The UE of claim 13, wherein reference of the SFI to the plurality of single slot format indicators is provided to the UE on a UE-specific basis.

18. The method of claim 1, wherein reference of the SFI to the plurality of single slot format indicators is provided to the UE on a UE-specific basis.

19. The method of claim 1, wherein the transmission directions include downlink, uplink and unknown directions.

20. The method of claim 1, wherein the communication is according to 5G new radio.

* * * * *